United States Patent
Stefansson et al.

(10) Patent No.: US 11,226,888 B1
(45) Date of Patent: Jan. 18, 2022

(54) SYSTEMS AND METHODS FOR FUNCTION ARGUMENT CHECKING

(71) Applicant: The MathWorks, Inc., Natick, MA (US)

(72) Inventors: Halldor N Stefansson, Natick, MA (US); Bryan T White, Holliston, MA (US); David A Foti, Holliston, MA (US); Jianzhong Xue, Sherborn, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 16/742,237

(22) Filed: Jan. 14, 2020

(51) Int. Cl.
*G06F 9/44* (2018.01)
*G06F 11/36* (2006.01)

(52) U.S. Cl.
CPC .................. *G06F 11/3612* (2013.01)

(58) Field of Classification Search
CPC .................................... G06F 11/3612
See application file for complete search history.

(56) References Cited

U.S. PATENT DOCUMENTS

| | | | | |
|---|---|---|---|---|
| 2009/0288073 A1* | 11/2009 | Gosalia | ............ | G06F 8/33 717/141 |
| 2013/0091152 A1* | 4/2013 | Ionescu | ............ | G06F 16/95 707/754 |
| 2014/0033314 A1* | 1/2014 | Wibbeler | ............ | G06F 21/52 726/26 |
| 2016/0070636 A1* | 3/2016 | Furtwangler | ............ | G06F 8/437 717/126 |
| 2016/0202955 A1* | 7/2016 | Vanags | ............ | G06F 8/74 717/114 |

* cited by examiner

*Primary Examiner* — Hang Pan
(74) *Attorney, Agent, or Firm* — Finnegan, Henderson, Farabow, Garrett & Dunner, LLP

(57) ABSTRACT

Systems and methods for function argument checking are disclosed. The systems and methods can use declarations and validation instructions based on the declarations. Validation instructions for a function can be generated automatically from a declaration for the function. The validation instructions can be executed in response to invocation of the function. The validation instructions can include instructions for determining whether an input satisfies a condition on a corresponding argument of the function, instructions for identifying a position of the input, and instructions for providing, in response to determining that the input does not satisfy the condition, an indication of the nonsatisfaction of the condition and the position. The condition can specify a datatype or size for the argument or one or more validation functions for checking the argument.

27 Claims, 15 Drawing Sheets

200

```
1   if nargin < 1
2      ex = tooFewInputsException('foo', 1);
3      throw(ex);
4   end
5   if ~isa(x, 'double')
6      try
7         x = convertToDouble(x);
8      catch ex
9         ex = failedToConvertException(ex, 1, 'double', x);
10        throw(ex);
11     end
12  end
```

FIG. 2

```
1 function fun2(x, y)
2   arguments (Repeating)
3     x double {mustBePositive}
4     y string
5   end
6
7 %function body
8
9 end
```

FIG. 4A

```
1  if mod(nargin, 2) ~= 0
2    ex = incorrectNumberOfRepeatingInputs('foo', nargin, 2);
3    throw(ex);
4  end
5  i = 1;
6  x = cell(1, floor(nargin/2));
7  y = cell(1, floor(nargin/2));
8  for j = 1:2:nargin
9    % Validate the i-th value of x. This is the j-th input argument.
10   current = varargin{j};
11   if ~isa(current, 'double')
12     try
13       current = convertToDouble(current);
14     catch ex
15       ex = failedToConvertException(ex, j, 'double', current);
16       throw(ex);
17     end
18   end
19   try
20     mustBePositive(current);
21   catch ex
22     ex = validationFunctionFailedException(ex, j, current);
23     throw(ex);
24   end
25   x{i} = current;
26
27   % Validate the i-th value of y. This is the (j+1)-th input argument.
28   current = varargin{j + 1};
29   if ~isa(current, 'string')
30     try
31       current = convertToString(current);
32     catch ex
33       ex = failedToConvertException(ex, j + 1, 'string', current);
34       throw(ex);
35     end
36   end
37   y{i} = current;
38   i = i + 1;
39 end
```

FIG. 4B

```
>> fun2(1, 'as', -2, 'ty', 34, 'qwerty')
            ^
Error using fun2
Value must be positive.
```

FIG. 4C

```
1 function fun3(nvpairs)
2   arguments
3     nvpairs.Name string
4     nvpairs.Height double {mustBePositive}
5   end
6
7 %function body
8
9 end
```

FIG. 5A

```
1  function fun3transformed(varargin)
2    nargs = length(varargin);
3    options = ["Name", "Height"];
4    vindex = zeros(1, numel(options));
5    nvpairs = struct;
6    % Map the names of the input arguments to their positions and validate the
7    % names of the name-value pairs.
8    for j = nargs-1:-2:1
9      pname = varargin{j};
10     if ~isValidDataTypeForName(pname)
11       ex = notValidDataTypeForNameException(j, pname, options);
12       throw(ex);
13     end
14     mask = findMatchingNameInListOfAllowedNames(options, pname);
15     if ~any(mask)
16       % The input pname doesn't match any of the allowed names.
17       ex = nameNotOneOfAllowedNames(j, pname, options);
18       throw(ex);
19     elseif sum(mask) > 1
20       % The input pname matches many of the allowed names.
21       ex = ambigousNameException(j, pname, options(mask));
22       throw(ex);
23     end
24     if ~vindex(mask)
25       % Store the argument position of the value corresponding to the
26       % input pname.
27       vindex(mask) = j + 1;
28     end
29     nargs = nargs-2;
30   end
31   if nargs > 0
32     ex = moreInputsThanNeeded(nargs, varargin, options);
33     throw(ex);
34   end
```

FIG. 5B

```
35  % We have now mapped the input arguments to their positions in the function
36  % call argument list.
37  % In the argument declaration, 'Name' is first, followed by 'Height'. The
38  % argument positions of where the values corresponding to these names are
39  % specified in the function call are stored in vindex(1) and vindex(2),
40  % respectively.
41
42  % Validate the value specified for 'Name', if any:
43  vi = vindex(1);
44  if vi > 0
45     current = varargin{vi};
46     if ~isa(current, 'string')
47        try
48           current = convertToString(current);
49        catch ex
50           ex = failedToConvertException(ex, vi, 'Name', 'string', current);
51           throw(ex);
52        end
53     end
54     nvpairs.Name = current;
55  end
56
57  % Validate the value specified for 'Height', if any:
58  vi = vindex(2);
59  if vi > 0
60     current = varargin{vi};
61     if ~isa(current, 'double')
62        try
63           current = convertToDouble(current);
64        catch ex
65           ex = failedToConvertException(ex, vi, 'Height', 'double', current);
66           throw(ex);
67        end
68     end
69     try
70        mustBePositive(current);
71     catch ex
72        throw(ex);
73     end
74     nvpairs.Height = current;
75  end
76
77  % function body
78
79  end
```

FIG. 5C

```
1 function fun4(optional)
2    arguments
3       optional.?MyClass
4    end
5
6 %function body
7
8 end
```

FIG. 6A

```
1  function fun4transformed(varargin)
2     nargs = length(varargin);
3     options = getPublicSettableProperties('MyClass');
4     vindex = zeros(1, numel(options));
5     optional = struct;
6     for j = nargs-1:-2:1
7        pname = varargin{j};
8        if ~isValidDataTypeForName(pname)
9           ex = notValidDataTypeForNameException(j, pname, options);
10          throw(ex);
11       end
12       mask = findMatchingNameInListOfAllowedNames(options, pname);
13       if ~any(mask)
14          % The input pname doesn't match any of the allowed names.
15          ex = nameNotOneOfAllowedNames(j, pname, options);
16          throw(ex);
17       elseif sum(mask) > 1
18          % The input pname matches many of the allowed names.
19          ex = ambigousNameException(j, pname, options(mask));
20          throw(ex);
21       end
22       % Store the argument position of the value corresponding to the
23       % input pname.
24       if ~vindex(mask)
25          vindex(mask) = j + 1;
26       end
27       nargs = nargs - 2;
28    end
29    if nargs > 0
30       ex = moreInputsThanNeeded(nargs, varargin, options);
31       throw(ex);
32    end
```

FIG. 6B

```
33  % We have now mapped the input arguments to their positions
34  % in the function call argument list.
35  % The argument position where the first property of MyClass
36  % is found corresponds to input argument vindex(1) in the
37  % function call, second property corresponds to input argument
38  % vindex(2), etc.
39
40  % Validate the provided input values against the validators
41  % of the properties in MyClass.
42
43  for index = 1:numel(options)
44     vi = vindex(index);
45     if vi > 0
46        propName = options{index};
47        current = varargin{vi};
48        try
49           optional.(propName) =
   validateValueUsingValidatorsFromClass(current, 'MyClass',
     propName);
50        catch ex
51           ex = failedPropertyValidationException(
   ex, vi, propName, current);
52           throw(ex);
53        end
54     end
55  end
56
57  %function body
58
59  end
```

```
function myFunction(inputArg, NameValueArgs, structName)
    arguments (Repeating)
        inputArg size datatype validation_function
    end
    arguments
        NameValueArgs.Name1 size datatype validation_function = defaultValue
        structName.?ClassName
        structName.PropertyName size datatype validation_function = defaultValue
    end
end
```

FIG. 8B

```
function myFunction(x:: (size) datatype {validation_function} = defaultValue,
                    y:: (size) datatype {validation_function} = defaultValue,
                    z:: (size) datatype {validation_function} = defaultValue)
end
```

FIG. 8C

```
"arguments" : [
    {
        "Repeating": "true",
        "inputArg" : [
            {
                "name" : "NameValue",
                "size" : "SizeValue",
                "class" : "ClassValue",
                "Validation_function" : [
                    {
                        "validation_function1"
                    }
                ],
                "default" : "DefaultValue"
            }
        ]
    }
]
```

FIG. 9A

```
>> createImage( "blank" , [10, 10])

Error using createImage
Value must be numeric.
```

FIG. 9B

```
>> createImage( "blank", [10, 10])
               ^^^^^^

Error using createImage
Value must be numeric.

Did you mean:
>> createImage([10, 10], "blank")
```

FIG. 9C

```
>> createImage( "blank" , [10, 10])

Error using createImage
Invalid input argument at position 1. Value must be numeric.
```

SYSTEMS AND METHODS FOR FUNCTION ARGUMENT CHECKING

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIG. 2 depicts exemplary validation instructions suitable for use with the declaration depicted in FIG. 1, consistent with disclosed embodiments.

FIGS. 4A and 4B depict an exemplary declaration and associated exemplary validation instructions suitable for use with repeated position arguments, consistent with disclosed embodiments.

FIG. 4C depicts a user interface providing an indication of an incorrect function invocation, consistent with disclosed embodiments.

FIGS. 5A to 5C depict an exemplary declaration and associated exemplary validation instructions suitable for use with name-value arguments, consistent with disclosed embodiments.

FIGS. 6A to 6C depict an exemplary declaration and associated exemplary validation instructions suitable for use with inherited conditions on arguments, consistent with disclosed embodiments.

FIGS. 8A to 8C depict exemplary declarations, consistent with disclosed embodiments.

FIGS. 9A to 9C depict exemplary error indications, consistent with disclosed embodiments.

DETAILED DESCRIPTION

Figure 1A:
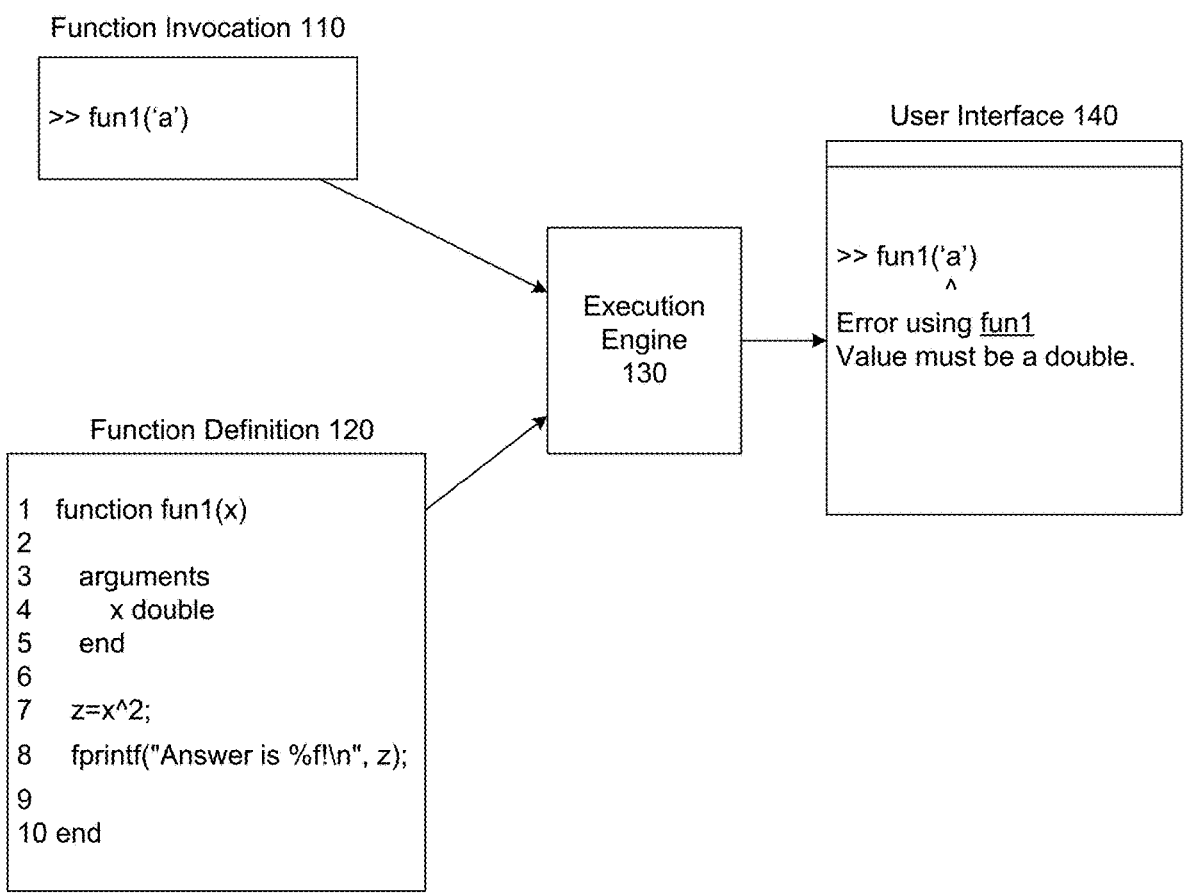
FIG. 1A depicts an exemplary system for argument checking, consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus the materials, methods, and examples are illustrative only and are not intended to be necessarily limiting.

Incorrect input(s) in a function invocation can cause a computer program to crash or behave in an unexpected way. Diagnosing and fixing such incorrect inputs can be difficult. Users may be unfamiliar with the internal operations of a function, as users often write programs using functions written by others. When a program invokes a function in an external library, changes to the library (e.g. updating to a new version of the library) may change the internal operations of the function, causing a previously correct invocation of the function to become incorrect. Program languages that support dynamic typing, in particular, may have problems with incorrect function arguments, as such languages may lack the type-checking automatically performed by strictly typed languages. Furthermore, users may be unable or unwilling to learn the correct inputs to a function, leading to user frustration and preventable programming errors.

Declarations that specify conditions on function arguments can provide a robust and portable way to check function invocation. Such declarations can have a simple and straightforward syntax that is easy for users, such as authors of the functions and declarations or users of functions and declarations authored by others, to use. A programming environment, such as a technical computing environment (TCE), can automatically generate validation instructions based on such a declaration. These validation instructions can be executed in response to invocation of the function to determine whether a function was correctly invoked (e.g., thereby ensuring that the function executes with valid input values). The user may only be responsible for the declaration portion of input validation, reducing the burden of developing and maintaining the function. The validation instructions automatically generated from the declarations can also improve the precision of error notification. The automatically generated code can be configured to track the inputs in the function invocation. Such tracking can enable the programming environment to report not only the existence of an error, but also the location of the incorrect input in the list of function arguments provided by the function invocation. In some embodiments, the validation instructions can also automatically correct inputs to the function invocation, or suggest corrections to incorrect inputs (e.g., through a descriptive error message). The function argument checks can help users understand code and assist with efficient and accurate programming. Such precise error reporting can benefit users interacting with the programming environment through a command line interface, as the disclosed embodiments can provide accurate feedback on the correct invocation of the function. Such feedback can make programming easier and more efficient, particularly for less-experienced users.

The disclosed embodiments can also improve the flexibility of error notification. The disclosed declarations can specify conditions on the datatype and size of an argument. In addition, these declarations can specify validation functions, which can provide more particularized restrictions on input values. For example, validation functions can be functions, procedures, or scripts that are passed the input argument being checked and any additional parameters specified in the validation declaration. Validation functions may check any aspect of the input argument's value and not just its datatype or size. Validation functions may also be used to check datatype and size. In some embodiments, either the datatype, size or both may be omitted from the declaration and these characteristics checked by validation functions. In other embodiments, validation functions may be used to check aspects of a datatype that aren't supported by datatype validation syntax. For example, if the datatype validation syntax allows only a single class name, a validation function may be used to enforce a condition that the datatype must be one of a set of types or not one of a set of types. In a similar manner, validation functions may be used to check size constraints that are not supported by size validation syntax. Examples of such cases might include checking that the size of a first input argument is the same as the size of a second input argument or checking that the length of an argument's 2 dimensions are the same. Validation functions are passed the runtime values of the input arguments and may perform checks that go beyond what is possible with static type checking. For example, if an input datatype supports arrays of both real and complex (imaginary) values, a validation function may require that all the values be real. Other example validation functions may require that values lie within a certain numeric range or have certain properties. The validation functions can be built-in or user-defined, offering an additional degree of extensibility and flexibility. The programming environment may enforce certain requirements on validation functions such as requiring that a validation function not have side effects. In some embodiments, the validation functions are a set of zero or more functions so that functions which check different aspects of input values can be combined together to enforce a set of features on input values. In various embodiments, the validation functions may be limited to zero or one function and that function can then call additional functions to compose a set of requirements.

Accordingly, the disclosed embodiments provide a robust and portable (e.g., enabling reuse of code in differing versions of a programming environment) way to check function inputs provided in function invocations. The disclosed embodiments can improve the precision and flexibly of error notification using declarations and automatically generated validation instructions. More precise error report can assist users in identifying the source of errors in code that they write, use, or maintain. Validation functions can associate runtime value checks of function inputs, e.g., values provided to the function at runtime, with specific function arguments, e.g., the formal parameter or variable name used in the function declaration, thereby improving upon checks based purely on a programming language type system. This enables a programming environment to have more explicit information about allowed values of function inputs and to provide better hints and error messages to users.

FIG. 1 depicts an exemplary system 100 for argument checking, consistent with disclosed embodiments. System 100 can include an execution engine 130 of a programming environment (e.g., a TCE). In response to invocation of a function (e.g., function invocation 110), the execution engine can be configured to execute validation instructions that determine whether inputs in the function invocation satisfy conditions on corresponding arguments of the function (e.g., inputs failing to satisfy conditions on corresponding argument may be "incorrect" inputs). The validation instructions can track the inputs, enabling the programming environment to report which input (if any) failed to satisfy which condition. The programming environment can provide an indication to the user of the incorrect input (e.g., the location of the input within the function invocation) and the unsatisfied condition. The indication can be provided in a user interface (e.g., user interface 140). The validation instructions can be generated based on a declaration (e.g., included in function definition 120), which can specify the conditions on the arguments to the function. The validation instructions can be generated prior to, or during, invocation of the function. In this manner, system 100 can enable precise detection and reporting of incorrect functions inputs.

Function invocation 110 can be an instruction to call a function, consistent with disclosed embodiments. The function can have one or more arguments. The number of arguments can be fixed or can vary. For example, the function can have optional arguments or accept repeated arguments. In some instances, function invocation 110 can be entered at a command line of a user interface. In various instances, function invocation 110 can be part of a script, function, file, or the like, which can be executed (e.g., interpreted or compiled and run) to invoke the function. In some instances, function invocation 110 can include one or more inputs in an input order. The inputs can have positions in the input order and input values. The inputs can correspond to the arguments of the function. In some instances, the correspondence between an input and an argument can depend on the position of the input in the input order. For example, a first input in the input order of the function invocation can correspond to a first argument in an argument order of the function, and so on. As an additional example, the function invocation can include pairs of inputs, the first input in each pair corresponding to a first argument in the argument order and the second input in each pair corresponding to a second argument in the argument order.

In various instances, the correspondence between an input and an argument can be independent of the position of the input in the input order. For example, an input can be a name-value input. The name-value input can include a pair of input values. One input value can indicate the argument to which the other input value corresponds. For example, the function "fun" may include a declaration specifying two name-value inputs:

arguments
information.name string
information.age int
end

In this non-limiting example, "information" can be a structure that stores name-value arguments as fields. This declaration can specify, as described herein, a "name" argument of type "string" and an "age" argument of type "integer". The following examples depict non-limiting exemplary invocations of function "fun":

fun("name", name_value, "age", age_value)
fun("age"=age_value, "name"=value)
fun("name"::name_value, "age"::age_value)

As apparent from these examples, the correspondence between an input in an invocation of function "fun" and an argument does not depend on the order of the input in the function invocation. Instead, the input "name" can indicate the argument of "fun" that should take the value of the input "name_value". In these example, the value of input "name_value" or "age_value" can be determined and validated according to disclosed embodiments at runtime.

Function definition 120 can include a declaration that is evaluated when the function is invoked, consistent with disclosed embodiments. Function definition 120 can specify one or more arguments. Function definition 120 can be configured to determine whether inputs in function invocation 110 satisfy conditions specified for corresponding arguments. Function definition 120 can be configured to establish a correspondence between the inputs in function invocation 110 and arguments in function definition 120. This correspondence can be used to identify incorrect inputs and their locations in function invocation 110.

An argument order can be associated with function definition 120. For example, a function signature or declaration of function definition 120 can specify an order for the arguments. In the example of FIG. 4A, the depicted function definition includes a function signature "function fun2(x, y)" and a declaration that specify an order for the arguments (e.g., argument "x" and then argument "y"). In some embodiments, the argument order in function definition 120 can differ from the input order in function invocation 110. For example, the number of arguments specified in function definition 120 can differ from the number of input values in function invocation 110. As an additional example, the function definition can specify a subset of optional arguments. In some instances, function invocation 110 may not include input values corresponding to these optional arguments, resulting in a difference between the input order and the argument order. For example, function definition 120 can specify a default value for an argument. Function invocation 110 need not then include an input value corresponding to this argument. As a further example, multiple sets of inputs in function invocation 110 can correspond to a single subset of arguments in function definition 120. For example, in some instances, function definition 120 can specify repeated positional arguments, as described herein. Multiple sets of inputs can correspond to these repeated position arguments. As an additional example, function definition 120 can specify name-value arguments, and a position of a name-value argument in the argument order can differ from a position of a corresponding name-value input pair in the input order.

Function definition 120 can include a function body, consistent with disclosed embodiments. The function body can include instructions that provide the functionality performed by the function (e.g., lines 7 and 8, or the like). In some instances, the values of the one or more arguments can be used in the function body. The content and arrangement of the function body are not intended to be limiting.

Function definition 120 can include a function signature, consistent with disclosed embodiments. In some instances, the function signature can specify one or more arguments to the function (e.g., "function fun(a, b, c)", or the like). In some instances, the function signature can specify a positional correspondence between the input order and the argument order (e.g., depending on the declaration). As an example of such a correspondence, the first input in function invocation 110 can correspond to the first input in the function signature. In various instances, the positional correspondence between the input order and the argument order can be independent of the function signature. As an example of such independence, when the inputs are name-value inputs (e.g., a pair of inputs including a name input and a value input, as described above) the names can define correspondence between the inputs in function invocation 110 and the arguments in function definition 120, regardless of the position of the name-value input in the input order.

Function definition 120 can include a declaration, consistent with disclosed embodiments. In some instances, the declaration can specify at least one condition on at least one of the arguments to the function. In some instances, the declaration (or the declaration in combination with a function signature) can specify a positional correspondence between the input order and the argument order. The declaration can be used to generate validation instructions that validate the conditions on the arguments, as described herein.

A condition can specify a size (e.g., scalar, a vector, array, or the like) or datatype of an argument, consistent with disclosed embodiments. In some instances, a condition can specify the dimensions of an argument. A condition can also specify one or more dimensions of an argument, while leaving the other dimensions unspecified. A specified datatype can be a fundamental datatype (e.g., a "double", "character", "integer", "logical", "cell array" datatype, or the like), a built-in datatype (e.g., a "datetime", "table", or the like), or a user-defined datatype, or the like. As a non-limiting example, the instruction "A (1, 1) string" can specify that the argument "A" is a scalar of datatype "string". As a further non-limiting example, the instruction "B (1, :) double" can specify that the argument "B" is a vector of doubles including a single column and any number of rows. As an additional non-limiting example, the instruction "C (2, 2) cell" can specify that the argument "C" is a two-by-two array of cells.

A condition can restrict the value of an input associated with an argument, consistent with disclosed embodiments. A condition can specify a default value of an argument, consistent with disclosed embodiments. When the function is invoked without an input value corresponding to the argument, the default value can be assigned to the argument. As a non-limiting example, a declaration for a function can specify:

function fun(lineOptions)
  arguments
   lineOptions.LineStyle="-"
  end
 end

This declaration specifies that a name-value argument "LineStyle" has the default value "-". When the function is invoked without an input value corresponding to the name-value argument "LineStyle", the name-value argument "LineStyle" will be assigned the default value "-".

A condition can be absolute (e.g., depend only on the input value corresponding to the argument) or relative (e.g., can depend on a constant or an input value corresponding to another argument), consistent with disclosed embodiments. For example, the declaration can specify that a length of a first input value corresponding to a first argument be less than a length of a second input value corresponding to a second argument. As an additional example, the declaration can specify that a length of a first input value corresponding to a first argument be less than a constant value. As the following non-limiting example, the declaration can specify that a default value of one argument (e.g., "y") is based on a function (e.g., the maximum) of an input value associated with another argument (e.g., "x"):

function fun(x, y)
  arguments
   x (1, 10) double
   y double=max(x)
  end

In this example, the declaration specifies that the value of the first input corresponds to argument "x" and is a one-by-ten array of "double". The declaration further specifies that the value of the second input is a double with a default value equal to the maximum of argument "x".

A condition can specify one or more functions for checking an input value corresponding to an argument, consistent with disclosed embodiments. The functions can be built-in or user-defined. The functions can impose conditions on size, datatype, or value of an argument, as described herein. For example, built-in functions can impose a requirement that an input value associated with an argument be positive, non-positive, finite, non-NaN, non-negative, negative, non-zero, non-empty, non-sparse, numeric, numeric or logical, an integer, greater than another value, less than the other value, greater than or equal to the other value, less than or equal to the other value, a member of a set (when the value specifies a set), or the like. In some embodiments, such functions can provide a flexible, composable, and extensible way to impose conditions on arguments.

A function definition can include a function signature and declaration that specify that no conditions are imposed on an argument, consistent with disclosed embodiments. Such a specification can avoid imposing conditions on a prior argument in the argument order while still imposing conditions on a subsequent argument in the argument order. For example, the following function signature and declaration can specify that no conditions are imposed on the first input in an invocation of "fun", while the second input must be of datatype double:

function fun(~, x)
   arguments
     ~
     x double
   end

As described herein, function definition 120 can establish a correspondence between the inputs in function invocation 110 and the arguments in function definition 120. In some instances, the correspondence can be positional. Function definition 120 can establish the correspondence based on a position of the input in the input order and a position of the argument in the function definition. In various instances, the correspondence can be based on the name of argument. Function definition 120 can specify that the function accepts name-value inputs. Function invocation 110 can then include one or more pairs of names and values, the name in each pair identifying the argument that takes the value. Alternatively, the name and its value may be specified using special syntax, such as "name=value" so that named inputs may be easily distinguished from positional inputs.

In some embodiments, function definition 120 can include a declaration that specifies a positional correspondence between at least one input in function invocation 110 and at least one respective argument in function definition 120. In some embodiments, function definition 120 can include a function signature that, together with the declaration, specifies the positional correspondence.

FIG. 1 depicts an exemplary declaration that specifies a positional correspondence between argument "x" of "fun1" and a first input in an invocation of "fun1", consistent with disclosed embodiments. This exemplary declaration includes an arguments block beginning with an "arguments" keyword and ending with the "end" keyword (e.g., lines 3 to 5). The arguments block includes an instruction that imposes on argument "x" of "fun1" the condition that argument "x" be of datatype "double". In this non-limiting example, the first argument in the arguments block can be associated with the first input in function invocation 110. Additional arguments in the arguments block could then be associated with additional inputs in function invocation 110. For example, were the arguments block to include:

arguments
     x double
     y string
     z cell
   end then function invocation 110 would require three inputs, the first input corresponding to argument "x", the second input corresponding to argument "y", and the third input corresponding to argument "z". In some embodiments, the order of positional arguments in the arguments block (e.g., the argument order) may necessarily match the order of positional arguments in the function signature.

In some embodiments, the declaration (e.g., lines 3 to 5) can specify arguments corresponding to sets of inputs. For example, as shown in FIG. 4A, an argument block can include the keyword "Repeating". In some instances, the keyword "Repeating" can indicate that the function invocation includes sets of inputs. Within each set of inputs, a positional correspondence can be established between the inputs in the set and arguments. In the non-limiting example depicted in FIG. 4A, the first input in each set of inputs can correspond to argument "x" and the second input in each set of inputs corresponds to argument "y".

In some embodiments, function definition 120 can include a declaration that specifies a name-value correspondence between at least one input in function invocation 110 and at least one respective argument in function definition 120. In some embodiments, function definition 120 can include a function signature that, together with the declaration, specifies the name-value correspondence. For example, FIG. 5A depicts a function signature for function "fun3" specifying a structure "nvpairs" (e.g., line 1) and a declaration specifying arguments to this function as a fields in this structure (e.g., lines 3 and 4) and conditions on the arguments as conditions on the fields of the structure. At runtime, these conditions can be checked for values of name-value inputs with names corresponding to the field names (e.g., values of "Name" or "Height"). As an additional example, FIG. 6A depicts a function signature for function "fun4" specifying a structure "optional" (e.g., line 1) and a declaration specifying arguments to this function using the properties of a class as a template (e.g., line 3). In some instances, the function can inherit both the properties of the class and any conditions on these properties specified by the class. In some embodiments, the function may only use the public (e.g., as opposed to private, protected, internal or the like) properties of the class as a template.

In some embodiments, a declaration can combine positional and name-value correspondences. Some inputs in a function invocation can be positionally associated with arguments to the function, while other arguments can be associated with name-value pairs including a name value and an input value. In some embodiments, such association types may be restricted to certain combinations or orderings within a declaration. For example, in some embodiments, an arguments block may not include both instructions specifying repeating positional correspondences and instructions specifying name-value correspondences. As an additional example, an arguments block may include instructions specifying positional correspondences before instructions specifying repeating correspondences or name-value correspondences. In some instances, a declaration may include multiple argument blocks. For example, a first arguments block can include instructions establishing positional correspondences, a second arguments block can include instructions establishing repeated position correspondences, and a third arguments block can include instructions establishing name-value correspondences.

Execution engine 130 can be an execution engine of a programming environment (e.g., a TCE), as described herein. Execution engine 130 can include an interpreter or a compiler. In some embodiments, the compiler may support just-in-time (JIT) compilation. Execution engine 130 can be configured to execute (e.g., interpret or compile and run) function definition 120 in response to executing function invocation 110.

Execution engine 130 can be configured to generate validation instructions based on function definition 120, consistent with disclosed embodiments. In some embodiments, the validation instructions can be generated based on a declaration. The declaration can be included in function definition 120. The validation instructions can handle determining which inputs in function invocation 110 correspond to which arguments in the declaration. The validation instructions can further handle determining whether a value of an input corresponding to an argument satisfies a condition specified in the declaration for the argument.

Execution engine 130 can be configured to generate the validation instructions in response to or before execution of function invocation 110, consistent with disclosed embodiments. In some embodiments, execution engine 130 can generate the validation instructions in response to an indication to interpret or compile function invocation 110 (e.g., entry of function invocation 110, or a script, function, or file containing function invocation 110 at a command line; or instructions to compile function invocation 110, or a script, function, or file containing function invocation 110; or the like). In some embodiments, execution engine 130 can generate the validation instructions in response to obtaining function definition 120. For example, execution engine 130 can generate validation instructions when function definition 120 is generated (e.g., edited or saved by a user, or automatically generated using a code generation tool, or the like), received from another system, or retrieved from a computer-readable medium or memory accessible to execution engine 130.

Consistent with disclosed embodiments, the validation instructions can be implemented in a high-level programming language (e.g., C++, C, Fortran, Pascal, the M language, a MATLAB® language, Julia, or the like), an intermediate representation (e.g., LLVM code, or the like), assembly, bytecode, machine code, or the like. The validation instructions can be human readable or only machine readable. The disclosed embodiments are not intended to be limited to validation instructions implemented in a particular programming language or at a particular level of abstraction.

As depicted in FIGS. 2, 4B, 5B and 5C, and 6B and 6C, the validation instructions can include instructions that handle checking and identifying inputs to an invocation of a function. In some embodiments, the instructions can handle determining, for each input in the function invocation, whether the input satisfies a condition specified by the declaration for a corresponding argument. The instructions can also identify the position of the input within the input order of the function invocation. In some embodiments, the instructions can sequentially determine whether each input satisfies the condition or identifies the position of the input. For example, the instructions can include a loop that iterates over the inputs of the function invocation. The validation instructions can include instructions with the loop that determine whether each input satisfies the condition or tracks the position of the input.

In some embodiments, the validation instructions can include a subset of instructions that handle checking the conditions on arguments specified by the declarations. In the non-limiting example depicted in FIG. 2, validation instructions 200 are generated based on the declaration included in function definition 120. Validation instructions 200 can include instructions that handle testing whether function invocation 110 includes a sufficient number of inputs (e.g., line 1) and whether the value of the input corresponding to argument "x" satisfies the conditions specified by function definition 120 on argument "x" (e.g., lines 5 and 7).

In some embodiments, the validation instructions can include a subset of instructions that handle tracking inputs to an invocation of a function. In some instances, function definition 120 can specify a positional correspondence between an input and an argument. For example, the declaration (or declaration and function signature) in function definition 120 can specify that the input position within the input order is constant (e.g., an argument always corresponds to the first input, second input, etc.). In such instances, the subset of instructions tracking the input within the function invocation can encode a constant value for a position of the input in the invocation. The constant value can represent a position of the input within the function invocation (e.g., the first input, second input, or the like) or a position of the characters corresponding to the input within the function invocation (e.g., the position in the function invocation of the first character of the input, the last character of the input, or a range of characters corresponding to the input). In the non-limiting example depicted in FIG. 2, the declaration specifies that the argument "x" always corresponds to the first input in the function invocation. Accordingly, the subset of instructions can identify the input corresponding to argument "x" by encoding the constant value "1" for the position of the input in validation instructions 200 (e.g., at line 9, or the like).

In some instances, function definition 120 can specify a variable correspondence between an input and an argument. In some embodiments, such a variable correspondence may not be determined until run-time, when the function is invoked. For example, as disclosed in FIGS. 4A to 4C, the declaration can specify repeated position arguments (e.g., that one or more sets of inputs correspond to the arguments). For such repeated position arguments, the number of inputs can determine which input positions in the input order correspond to which arguments. For example, given a declaration that specifies two repeated arguments, when the function is invoked with two inputs, the first input corresponds to the first argument and the second input corresponds to the second input. When the function is invoked with six inputs, the first, third, and fifth inputs can correspond to the first argument and the second, fourth and sixth inputs can correspond to the second argument. As an additional example, as disclosed in FIGS. 5A to 5C, the declaration can specify name-value arguments (e.g., "Name" and "Height"). The function can be invoked with name-value inputs corresponding to the name-value arguments in different orders. For example, function "fun3" depicted in FIG. 5A can be invoked with the "Name" input before the "Height" input:

fun3("Name", "Jane", "Height", 62)

Alternatively, function "fun3" depicted in FIG. 5A can be invoked with the "Height" input before the "Name" input:

fun3("Height", 62, "Name", "Jane")

In some embodiments, the position in the input order of the name-value input corresponding to each name-value arguments may not be known until runtime.

Accordingly, in some embodiments, when the declaration specifies a variable correspondence between an input and an argument, a position-tracking subset of the validation instructions can handle determining the run-time correspondence between the input and the argument. In some embodiments, the position-tracking subset can encode the variable correspondence between the input order and the argument order into a temporary variable or using an index variable. During execution of the validation instructions, based on the number or order of input variables provided at run-time, the temporary variable or index variable can be used to track the position of the input corresponding to the argument. The value of the temporary variable or index variable can then be used to provide an indication of the incorrect input. In various embodiments, the position-tracking subset of validation instructions can encode the variable correspondence into control flow instructions. For example, the position-tracking subset can include cases handling each of the name-value arguments. The position-tracking subset can be configured to route program execution between such cases depending on the current input or name-value pair of inputs. In some instances, the control flow instructions can encode the names of the name-value arguments. Exemplary control flow instructions can include if-then instructions, case-switch instructions, or the like. In various embodiments, the position-tracking subset can include validation functions parameterized by the names of the name-value arguments.

The validation instructions can include a subset of instructions that handle providing condition checking and input identification results, consistent with disclosed embodiments. When executed, this subset can provide an indication regarding the nonsatisfaction of a condition. The subset can further provide the position of the incorrect input in the function invocation. In some embodiments, this subset can be conditionally executed. For example, this subset can be executed in response to identifying nonsatisfaction of the condition. When executed, this subset can cause the programming environment (e.g., the TCE) to display the indication to a user, store the indication (e.g., in a computer-readable medium accessible to technical computing environment. or the like), or provide the indication to another system.

The subset of instructions that handle providing validation and identification results can be configured to generate an exception encoding the indication, consistent with disclosed embodiments. In some embodiments, the exception can include call stack information, message information, or correction information, as described herein with regards to FIG. 7. In some embodiments, an exception function when executed, can generate the exception. The subset can encode the position of the input value into a call to the exception function. An exception object generated by the exception function can therefore include an indication of the position of the incorrect input. The exception object, unless handled by instructions elsewhere in the validation instructions, function definition 120, or any script, file, or outer function including function invocation 110, can cause execution of the function (or script, file, or outer function, or the like) to cease. In some embodiments, control can return to the programming environment (e.g., the TCE), which can, as described herein, display the indication to a user, store the indication, or provide the indication to another system.

In the non-limiting example depicted in FIG. 2, instructions at lines 6 to 11 can handle providing validation and identification results. In this non-limiting example, the instruction at line 7, when executed, attempts to convert the input value corresponding to argument "x" into a "double" and throws an exception when the conversion attempt is unsuccessful. The instruction at line 8, when executed, catches any exception resulting from an unsuccessful conversion. The instruction at line 9 augments the caught exception with an indication of the position of the input value (e.g., "1"), the correct datatype (e.g., "double") and the incorrect input value (e.g., "x"). An instruction at line 9 can throw the augmented exception for handling elsewhere or display to the user, storage, or provision to another system.

As apparent from the foregoing examples, the subsets of instructions need not be mutually exclusive subsets. Instead, an instruction in the validation instructions may be part of multiple subsets (e.g., an instruction may be part of a subset of instructions handling tracking of input value positions, as well as a subset of instructions handling testing of a condition or reporting nonsatisfaction of the condition). In some embodiments, the functionalities of tracking an input value, testing whether the input value satisfies a condition, and providing an indication of nonsatisfaction of the condition, may be implemented by the validation instructions as a whole.

In some embodiments, execution engine 130 can be configured to execute the validation instructions in response to execution of the function (e.g., interpretation or compilation and running of function invocation 110). In some instances, execution engine 130 can insert the validation instructions into the function. For example, during execution or compilation, the validation instructions (or a reference to the validation instructions, an invocation of the validation instructions as a function, or the like), can be inserted into function definition 120 (or into a result of interpreting or compiling function definition 120, such as an intermediate representation generated from function definition 120). When program execution enters function definition 120, the validation instructions can be executed prior to executing the function body of function definition 120. The arguments of the function can therefore be automatically checked at run-time using run-time values of the inputs in function invocation 110.

User interface 140 can be configured to display an indication resulting from execution of the validation instructions, consistent with disclosed embodiments. The indication can indicate that the function invocation was incorrect, indication the reason the function invocation was incorrect, or suggest a correction to the function invocation. Additional non-limiting examples of such indications are provided in FIGS. 9A to 9C.

An indication resulting from execution of the validation instructions can be graphical or textual, consistent with disclosed embodiments. A graphical indication can include a representation of the incorrect function invocation or of the correct function invocation. In some instances, icons can be used to represent the inputs to the incorrect or correct function invocation. For example, a graphical representation can show an exemplary function invocation with one or more icons representing inputs. The icon representing each input could display the correct size or datatype of that input (e.g. the icon could be a matrix with the correct dimensions, with each element in the matrix being an icon indicating the correct datatype). A graphical indication can emphasize an incorrect input in the function invocation. For example, an arrow, box, or like graphic can be displayed to indicate the incorrect input.

A textual indication can include a message indicating an error occurred in executing the function invocation. In the non-limiting example depicted in FIG. 1, the message "Error using fun 1" and "Value must be a double" are displayed. In some embodiments, the position of the incorrect input can be displayed (e.g., the input number, the character position of the first character in the incorrect input, the last character in the incorrect input, the character range of the incorrect argument, or the like). A textual indication can include additional information to emphasize the incorrect input. For example, the textual indication can display additional characters to emphasize the incorrect input. As shown in FIG. 1, a caret can be displayed to indicate the incorrect input. In some embodiments, a caret can be displayed to indicate each character of an incorrect input in the text string comprising the function invocation. A textual indication can include changing the function invocation. For example, the incorrect input in the function invocation can be graphically emphasized. Such a graphical emphasize can be accomplished by changing the font, weight, italicization, or underlining of the incorrect input, swapping the background and text colors for the incorrect input, or adding an animation (e.g., a blinking cursor) that emphasizes the incorrect input.

The disclosed embodiments are not limited to declarations included in function definitions. In some embodiments, a function can be associated with a declaration separate from the function definition. For example, a declaration associated with a function can be stored in another file (e.g., a library of function declarations). In some embodiments, a function definition can include a reference to the declaration (e.g., a path, URL, load instruction, or the like). In various embodiments, the programming environment (e.g., the TCE) can maintain an association between the function definition and the declaration (e.g., using a linking file, a global variable, a naming convention, a file location convention, or the like).

The disclosed embodiments are not limited to declarations implemented in the same language as the function definition. For example, the function definition could be implemented using a high-level programming language (e.g., MATLAB, Python, C, Julia, or the like) and the declaration could be or refer to a document specifying conditions on arguments in a markup language or data interchange format (e.g., an XML, JSON, or YAML document). In some embodiments, execution engine 130 can be configured to generate the validation instructions using the document.

The disclosed embodiments are not limited to declarations generated using a textual interface (e.g., by entering text into an m-file, or the like). In some embodiments, a user can interact with a graphical user interface to create a declaration for a function. For example, a user can interact with dialogs, graphical controls such as radio buttons, drop-down menus, icons, or other like elements to impose conditions on a function argument. In some embodiments, the programming environment can be configured to generate a textual declaration based on these interactions and insert the declaration into the function. In various embodiments, the interactions can be used to generate metadata associated with the function. The programming environment can be configured to generate validation instructions using this metadata in response to compilation or run-time submission of the function.

The disclosed embodiments are not limited to manually created declarations. In some embodiments, a declaration for a function can be automatically created. Such a declaration can be created using comments in the function, documentation for the function, code in which the function is invoked, or the like. In some embodiments, the declarations can be automatically created by the programming environment (e.g., the TCE), or by another program running in the programming environment.

In some embodiments, comments or documentation can be parsed to determine correct invocations of the function. The comments or documentation can describe permissible input datatypes, sizes, values, or value ranges for the function (e.g., permissible input parameters). For example, the comments or documentation can include tags (e.g., markup language tags, or the like) or use formatting conventions to indicate the permissible input parameters. The tags or formatting conventions can be used to generate the declaration for the function, which can impose validation conditions reflecting the permissible input parameters. In various embodiments, a machine learning model can be trained to identify descriptions of permissible input parameters in comments or documentation.

In some embodiments, invocations of the function in code can be analyzed to determine correct invocations of the function. For example, the code can be analyzed (e.g., using static analysis, run-time analysis, or the like) to determine input parameters for invocations of the function in the code. The determined input parameters can be used to generate a declaration for the function, which can impose validation conditions reflecting the determined input parameters.

In some embodiments, the code analysis attempts to exclude invocations of the function with potentially incorrect input parameters. For example, the code analysis can exclude invocations of the function resulting in errors, or invocations for which the input parameters cannot be determined. As an additional example, the code analysis can exclude invocations of the function as potentially erroneous based on a frequency criterion. For example, function invocations with particular input parameters may be excluded when the function is invoked with these particular input parameters with less than a threshold frequency. For example, the function "fun1" may be invoked in code with either a single input of datatype "double" or a single input of datatype "string". However, "fun1" may be invoked in the code with a single input of datatype "string" less than some threshold frequency (e.g., 1%, 0.1%, or another suitable threshold value). Accordingly, invocations of "fun1" with a single input of datatype "string" may be excluded from the code analysis as potentially incorrect. As a result, "fun1" may be identified as taking a single input of datatype "double". An automatically generated declaration for "fun1" can therefore specify that "fun1" takes a single input of datatype "double".

The disclosed embodiments are not limited to executing the validation instructions by inserting them into the function. As disclosed in FIG. 1B, validation instructions can be inserted at the site of function invocation, consistent with disclosed embodiments. The site of function invocation can be a script (e.g., script 170), file, or second function that calls the original function, or the like. Execution engine 130 can be configured to compile the script, file, or second function. During compilation, the validation instructions can be inserted into the script, file, or second function, e.g., the validation instructions are inlined with the existing instructions in the script, file, or second function.

Figure 1B:
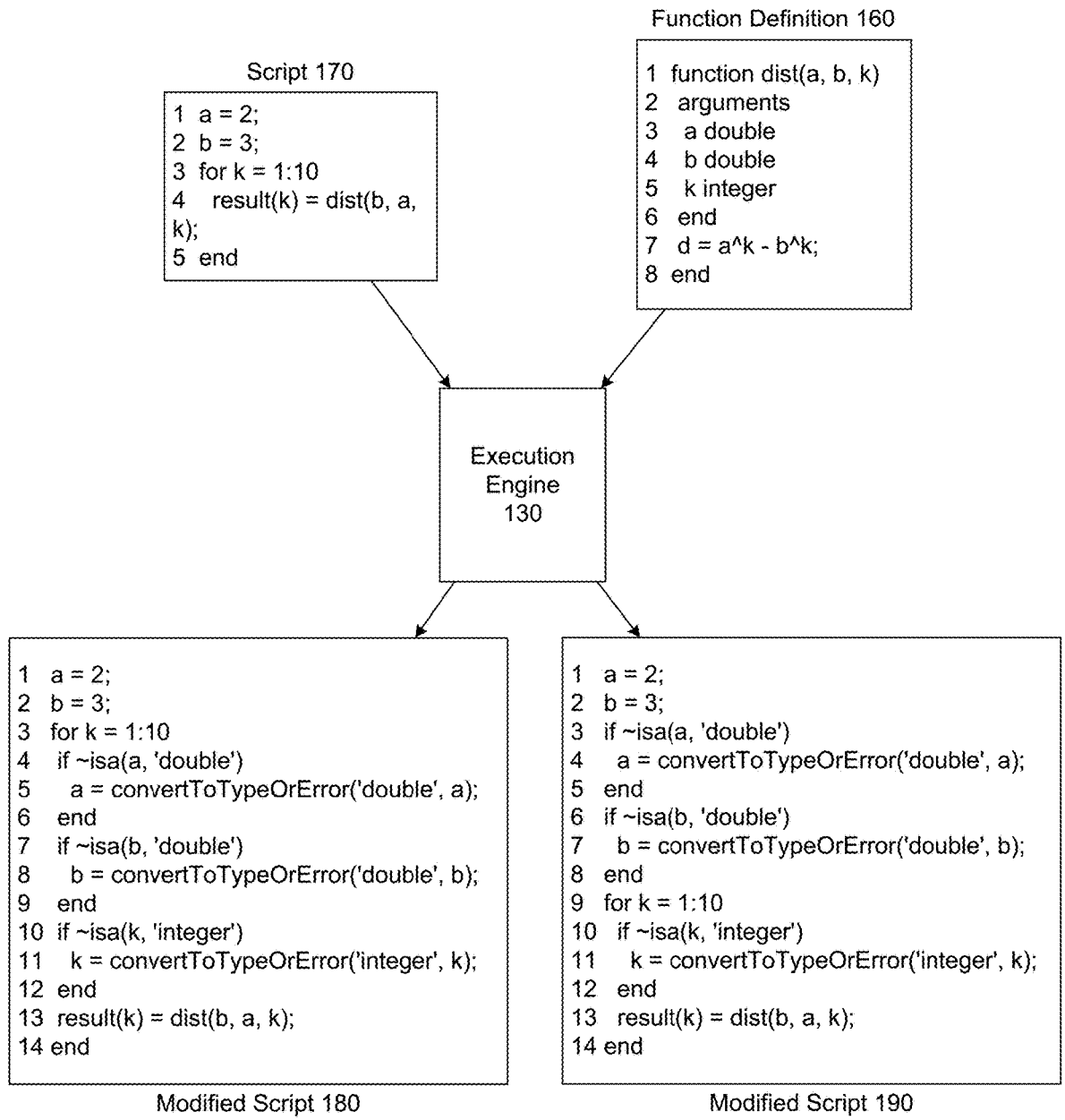
FIG. 1B depicts insertion of validation instructions into a site of function invocation, consistent with disclosed embodiments.

FIG. 1B provides a non-limiting example of inserting validation instructions at the site of function invocation, rather than into the function. Function definition 160 defines a function "dist" that calculates the difference between the $k^{th}$ power of two numbers (e.g., at line 7). The function "dist" includes a declaration (e.g., lines 2 to 6) specifying that the two numbers are doubles (e.g., lines 3 and 4) and the power is an integer (e.g., line 5). Script 170 initializes two numbers, a and b (e.g., lines 1 and 2), and then enters a loop. In each iteration of the loop, function "dist" is called to calculate the difference between b raised to the current loop index and a raised to the current loop index and the result is stored in an array (e.g., line 4).

Execution engine 130 can be configured to generate validation instructions, as described herein, and insert them into script 170 at the site of invocation of function "dist". Modified script 180 depicts a non-limiting result of such insertion. Within the loop (e.g., lines 4 to 15), new conditions have been added that check whether the values of the inputs to function "dist" satisfy the conditions specified in the declaration in function definition 160. Once this checking is complete, function "dist" is invoked (e.g., line 13). In some embodiments, the validation instructions can, when executed, generate an appropriate exception when the input values are incorrect.

In some embodiments, execution engine 130 can insert the validation instructions into the script, file, function, or the like before or during optimization of the compiled code. Execution engine 130 can then use compiler optimization techniques (e.g., loop optimization, dead code elimination, or the like) to reduce the impact of the validation instructions on the performance of the script, file, function, or the like. In this example, at least some of the validation instructions can be moved outside the "for" loop, so that they are executed only once, as shown in modified script 190 at lines 3 to 8. Alternatively, the execution engine can determine that the conditional instructions in the validation instructions will never be satisfied (e.g., as shown in Modified Script 190, "a" and "b" will always be doubles and "k" will always be an integer). In such a scenario, the validation instructions may be removed entirely as dead code, preventing performance of unnecessary checking. In this manner, inserting validation instructions at the site of function invocation, rather than into the function, can enable checking of conditions on arguments while reducing the overhead associated with such checking. Thus inserting validation instructions at the site of function invocation can increase the speed and efficiency of code execution.

In some embodiments, an incorrect input value can be traced to an origination point. In some instances, a script, file, or outer function can include the function invocation. After identifying an incorrect input value in a function invocation, the programming environment (e.g. TCE) can be configured to identify an origination point of the error in the script, file, or outer function. For example, when a datatype of an input value is incorrect, the programming environment can be configured to identify the origination point where that datatype was assigned to the input value. As an additional example, when the incorrect input for the function invocation results from an input value in the invocation of the outer function, the programming environment can identify the input value in the invocation of the outer function. The programming environment can determine the origination point of the incorrect input value using static analysis, code slicing, or the like.

Such tracing can benefit users by providing more meaningful error information. While the validation checking may involve the inputs to the function, the user may not know the relationship between the input value to the function and the origination point of the error. By indicating the origination point of the error, the burden on the user to identify and resolve the error can be reduced.

The disclosed embodiments are not limited to generation and execution of the validation instructions by the same processor, computing device, programming environment (e.g., TCE), or the like. In some embodiments, a programming environment, computing device, processor, or the like can generate the validation instructions. The validation instructions can then be associated with the function definition, as described herein. Another programming environment, computing device, processor, or the like can then execute the validation instructions in response to invocation of the function.

The disclosed embodiments are not limited to determination of incorrect inputs during execution of function definition 120. In some embodiments, function argument checking can be performed after function execution (e.g., to assist in identifying the cause of an error). For example, a function can be invoked, an exception generated, and control returned to the command line. In response, validation instructions for the function can be executed. In some embodiments, the validation instructions can be executed using the inputs to the function invocation. Such embodiments may permit handling validation of arguments outside the execution engine, and therefore may be suitable for deployment as an add-on or complement to the execution engine, or in situations where the execution engine cannot be modified (e.g., when the source code of the execution engine is not available).

In some embodiments, function argument checking can be performed at runtime before function execution. For example, a user can enter a function invocation at the command line of a programming environment (e.g., the TCE). The programming environment can intercept the function invocation and validate the arguments to the function before beginning execution of the function. In some embodiments, a declaration associated with function definition 120 can be compared to the inputs to the function invocation. The declaration can be implemented using a document in a markup language or data interconnection format. The document can be parsed to determine the conditions on the inputs to the function invocation. The conditions can then be compared to the inputs to the function invocation. In some embodiments, the programming environment can be configured to generate and execute validation instructions based on the conditions to check the inputs to the function invocation. If the function invocation includes an incorrect input, an indication of the incorrect input can be displayed to the user, as described herein. In such instances, the function may not be executed.

Figure 3:
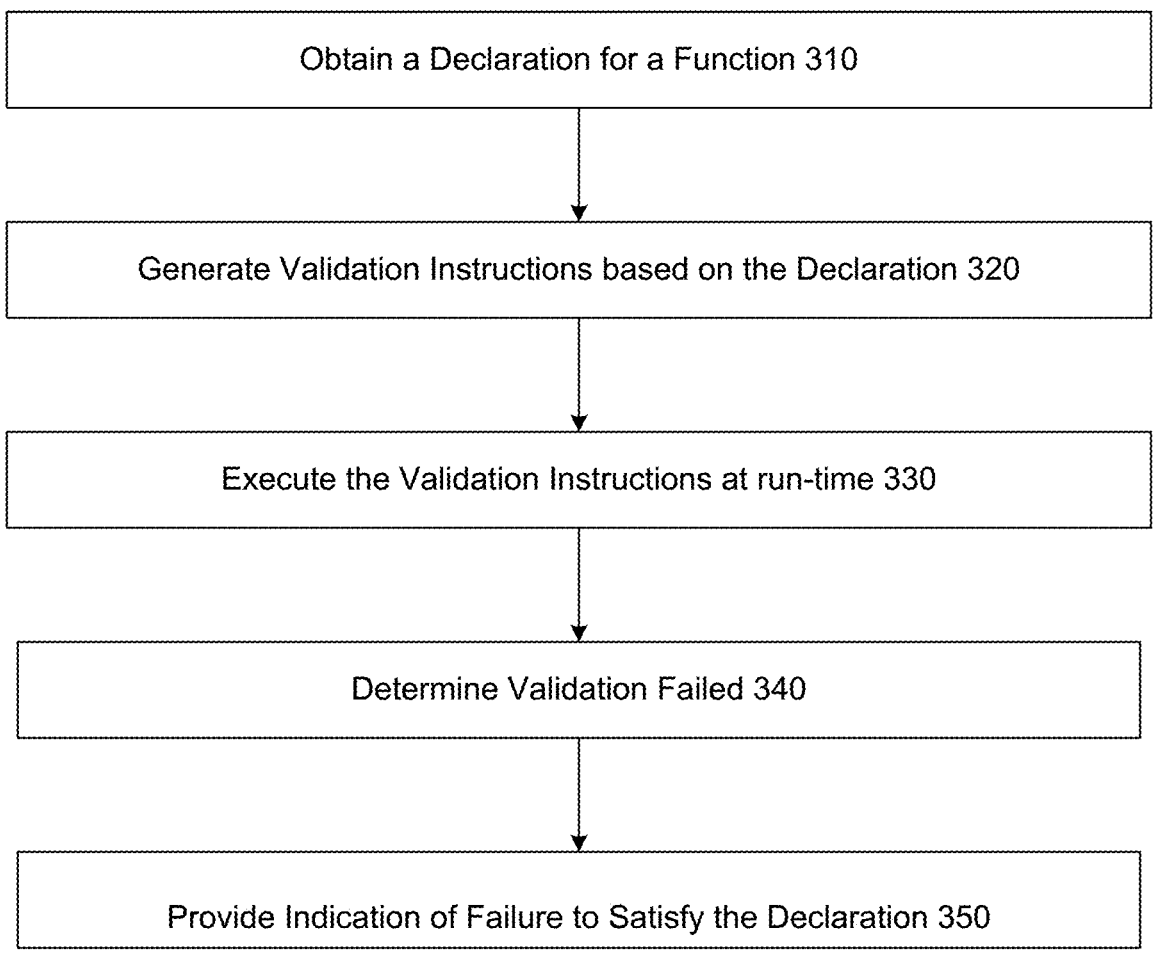
FIG. 3 depicts an exemplary process for function argument checking, consistent with disclosed embodiments.

FIG. 3 depicts an exemplary process 300 for function argument checking, consistent with disclosed embodiments. Process 300 can include obtaining a declaration for a function and generating validation instructions for the function. Process 300 can also include executing the validation instructions in response to an invocation of the function. Process 300 can further include providing an indication of one or more inputs not satisfying a condition imposed by the declaration on an argument of the function. In some embodiments, this indication can include a position of the one or more inputs not satisfying the condition. In some embodiments, process 300 can be performed by a programming environment (e.g., a TCE) implemented by one or more computing devices.

In step 310, a declaration can be obtained for a function. As described herein, in various embodiments, a function definition can include the declaration, or the declaration can be separate from the function definition. When the declaration is separate from the function definition, the declaration can be associated with the function definition (e.g., the declaration can include a reference to the declaration). In some embodiments, the declaration can be created manually or automatically. The declaration can specify conditions on arguments to the function. The conditions can include at least one of an absolute or relative run-time type, size, or value condition on an argument to the function.

In step 320, validation instructions can be generated based on the declaration. As described herein, in some embodiments, the validation instructions can be generated by a first execution engine of the programming environment. In some embodiments, the validation instructions can be generated during run-time or compilation. When the validation instructions are generated during run-time, the validation instructions may be generated each time the function is called, or generated once and then reused. In some embodiments, validation instructions generated during run-time may be reused during execution of the caller of the function; reused during a usage session of the programming environment in which the function was called; or a reused across multiple usage sessions of the programming environment. In some embodiments, the validation instructions can be reused until the function is modified. In various embodiments, the generated validation instructions may be stored in association with the function. For example, the validation instructions can be inlined into the function to create a modified version of the function, which can be stored for reused.

In step 330, validation instructions can be executed. As described herein, in some embodiments, the validation instructions can be executed in response to invocation of the function. In various embodiments, the validation instructions can be executed before, during, or after execution of the function. In some embodiments, the validation instructions can be executed by the execution engine of the programming environment, in another programming environment, or by another execution engine. The validation instructions can be executed at run-time, using the run-time values of the inputs to the function invocation.

In step 340, which can be part of step 330 and as described herein, an input corresponding to an argument of the function can be identified as not satisfying a condition specified in the declaration for the argument. FIGS. 4A to 6C provide non-limiting examples of such identification, which can include the steps of tracking an input can determining that the input is incorrect.

In step 350, which can be part of step 330 and as described herein, an indication can be provided that the input failed to satisfy the condition. As described herein, the indication can include an indication of the error, an indication of the incorrect argument (e.g., the name of the argument, a position of the input in the function invocation, a change in the graphical emphasis of the input in the function invocation, or the like), a message regarding the error, or a suggested correction of the error.

FIGS. 4A and 4B depict an exemplary declaration and associated exemplary validation instructions suitable for use with repeated position arguments, consistent with disclosed embodiments. FIG. 4A depicts the definition of a function "fun2" which takes repeated position arguments, consistent with disclosed embodiments. In this non-limiting example, the function "fun2" does not return a value and a comment represents the location of the body of the function. A declaration is indicated by the "arguments" keyword and the corresponding "end" keyword. The declaration includes conditions on two arguments. The argument "x" is declared to have type "double" and to satisfy the validation function "mustBePositive", which in this example requires the value of "x" to be positive. The variable "y" is declared to have type "string". The modifier "repeating" on the arguments keyword indicates that an invocation of "fun2" must include one or more repeats of the arguments "x" and "y". For example, the function "fun2" can be properly invoked with six input values (three repeats, with each repeat including a positive double—a repeating of argument "x"—followed by a string—a repeat of argument "y"). Invocations of "fun2" that do not satisfy the declaration will generate an indication of an incorrect function invocation, as shown in FIG. 4C.

FIG. 4B depicts validation instructions that implement the declaration depicted in FIG. 4A. As described herein, the validation instructions can be generated by an execution engine. The validation instructions can be generated in response to an invocation of the function "fun2". The validation instructions can be generated during run-time or during compilation. As an example of run-time generation, the validation instructions can be generated in response to submission, at a command line of a user interface, of an invocation of "fun2" or of a script file including an invocation of "fun2". As an example of generation during compilation, the validation instructions can be generated in response to compilation of "fun2" into another, lower-level representation (e.g., an intermediate representation, assembly, machine code, or the like).

The validation instructions depicted in FIG. 4B include instructions for checking and tracking repeated inputs. A subset of the instructions validates the input values in an invocation of function "fun2". Such instructions can validate that the function invocation includes a correct number of inputs. For example, the instruction at line 1 determines whether the number of input values in the invocation of "fun2" is evenly divisible by the number of arguments in the declaration. If the number of input values is not evenly divisible by the number of arguments in the declaration, then the invocation of "fun2" includes an incomplete set of arguments and does not satisfy the declaration.

As further depicted in FIG. 4B, the validation instructions can also include instructions that determine whether the input values in the function invocation satisfy the conditions imposed on the arguments by the declaration. In this example, the instructions can sequentially determine whether the input values in the function invocation satisfy the conditions imposed on the arguments by the declaration. In this example, the "for" loop beginning at line 8 and ending at line 39 iterates over each pair of input values corresponding to arguments "x" and "y" of "fun2".

The validation instructions can include instructions that implement, for each iteration for the "for" loop, the condition specified in the declaration that each repeat of the argument "x" be a positive double. For example, the conditional expression at line 11 determines whether the first input value in the current repeat is not of type "double". If not, at line 13 the validation instructions, when executed, can cause the programming environment (e.g., the TCE) to attempt to convert the first input value to a double. In addition, the instruction at line 20 can cause the programming environment to test whether the first input value in the current repeat is a positive double.

The validation instructions can also include instructions that implement, for each iteration of the "for" loop, the condition specified in the declaration that each repeat of the argument "y" be a string. The conditional expression at line 29 determines whether the second input value in the current repeat is not of type "string". If not, at line 31 the validation instructions attempt to convert the first input value to a string.

A subset of the instructions can track the positions of the input values in the function invocation. As depicted in FIG. 4B, the validation instructions can include instructions encoding an association between an index variable and a position of an input value within the invocation of "fun2". For example, the instruction at line 10 associates the first input value in the current repeat of the for loop with the index variable "j". Thus the position can be tracked based on the order in which each input values are evaluated. The value of the index variable "j" is the position of the first input value in the current repeat in a list of variables provided in the invocation of "fun2". Similarly, the instruction at line 28 associates the second input value in the current repeat with the index variable "j", as one plus the value of the index variable "j" is the position of the second input value in the current repeat in a list of variables provided in the invocation of "fun2".

A subset of the instructions can provide an indication regarding any nonsatisfaction of the condition and the input position. In some embodiments, the indication can be provided using an exception. As depicted in FIG. 4B, for example, the instructions at lines 12 to 17 handle providing an indication when the first input value in the current repeat is not convertible to a double. These instructions catch the error (e.g., an error object, or the like) when the first input value is not convertible to a double and augment this error with tracking information. The tracking information includes the current value of the index variable associated with the first input value in the current repeat. The error is also augmented with the appropriate type (e.g., "double") and the incorrect variable value to help user understand and correct the error. The instructions then throw the resulting augmented exception. The augmented exception may then be handled in the code that invoked the function (e.g., by an exception-handling construct in the code such as a try/catch block, or the like) or displayed in the user environment. Similar instructions elsewhere in the validation instructions handle providing an indication when an improper number of arguments is provided (e.g., lines 2 to 3), when the first input value in the current repeat is not positive (e.g., lines 19 to 24), and when the second input value in the current repeat is not a string (e.g., lines 30 to 35).

FIG. 4C depicts an exemplary user interface showing an improper invocation of the function "fun2" and a resulting error message. The depicted user interface includes a command line. The function "fun2" has been invoked at the command line with the arguments {1, 'as', −2, 'ty', 34, 'qwerty'}. The number of input values is correct—the function invocation includes three repeats of inputs corresponding to arguments "x" and "y". The types of the input values are also correct—the first input value in each repeat is of the type "double", while the second input value in each repeat is of the type "string". However, the third input value (the first input value in the second repeat) is not positive. The condition in the declaration that argument "x" must be positive is therefore not satisfied.

In response to invoking "fun2", the system has executed validation instructions, such as the validation instructions depicted in FIG. 4B. Because the condition that argument "x" must be positive is not satisfied for every repeat, execution of the validation instructions generates an error. This error includes information regarding which input value failed to satisfy the declaration (e.g., the third input value) and why this input value failed to satisfy the declaration (e.g., it was not positive). In some embodiments, the user interface can be configured to indicate this information. For example, as shown, the user interface can indicate the improper argument using a caret. As an additional example, the user interface can indicate the reason the argument is improper.

As described herein, the input order in a function invocation can differ from the argument order specified in a function definition for the function. In some instances, for example when a declaration specifies name-value arguments, the input order may differ between invocations of a function. Accordingly, the validation instructions can be configured to establish a correspondence between the input order and the argument order. Such a correspondence can be established by encoding identifiers (e.g., the names of the arguments or logical indexing arrays representing selected identifiers) for the arguments into the control flow of the validation instructions or by generating temporary variables that store associations between the input order and the argument order for each invocation.

FIGS. 5A to 5C depict an exemplary declaration and associated exemplary validation instructions suitable for use with name-value arguments, consistent with disclosed embodiments. FIG. 5A depicts the definition of a function "fun3" that takes name-value arguments, consistent with disclosed embodiments. In this non-limiting example, the function "fun3" does not return a value and a comment represents the location of the body of the function. A declaration is indicated by the "arguments" keyword and the corresponding "end" keyword. In this non-limiting example, the declaration includes a name-value structure "nvpairs" and specifies conditions on two name-value arguments defined as fields of the name-value structure "nvpairs". The argument "nvpairs.Name" is declared to have type "string". The argument "nvpairs.Height" is declared to have type "double" and to satisfy the validation function "mustBePositive", which in this example requires the value of "nvpairs.Height" to be positive. While the function signature includes the structure "nvpairs", invocations of the function are not limited to providing a structure as in input. In some embodiments, an invocation of "fun3" can take pairs of names and values as inputs. For example, a valid invocation may be fun3("height", 70, "name", "Max"). As can be seen from this example, the order of the names and values may differ from the order of the arguments in the declaration. Invocations of "fun3" that do not satisfy the declaration will generate an indication of an incorrect function invocation.

FIGS. 5B and 5C depicts validation instructions that implement the declaration depicted in FIG. 5A. As described herein, the validation instructions can be generated by an execution engine. The validation instructions can be generated in response to an invocation of the function "fun3". The validation instructions can be generated during run-time or during compilation. As an example of run-time generation, the validation instructions can be generated in response to submission, at a command line of a user interface, of an invocation of "fun3" or of a script file including an invocation of "fun3". As an example of generation during compilation, the validation instructions can be generated in response to compilation of "fun3" into another, lower-level representation (e.g., an intermediate representation, assembly, machine code, or the like).

The validation instructions depicted in FIGS. 5B and 5C (a continuation of FIG. 5B) includes exemplary instructions for checking and tracking name-value inputs. A subset of these instructions validates the input values in an invocation of function "fun3". As depicted in FIGS. 5B and 5C, the validation instructions can also include instructions that sequentially determine whether potential input names are valid. In this example, the "for" loop beginning at line 8 and ending a line 30 of FIG. 5B iterates over each pair of potential input names and input values. Furthermore, the validation instructions include control flow instructions that encode the names of the name-value argument, enabling verification of the appropriate conditions for each name-value input.

The validation instructions can include instructions that implement, for each iteration of the "for" loop, the implicit condition that potential input names are valid input names. In this example, the instruction at line 10 determines whether a potential input name has a valid data type for an input name. The instructions at lines 14 to 23 determine whether the potential input name unambiguously matches one of the input value names for "fun3". The instructions at lines 31 to 32 determine whether the function invocation includes more input values than needed (e.g., in the invocation fun3("Name", "Jane", "Height", 66, "Eyes", "Green") the name-value pair {"Eyes", "Green"} is invalid input). In this non-limiting example, the names of the name-value arguments are encoded into the control flow of the validation instructions using the instructions at lines 3, 4, and 14 and the control flow instructions at lines 15, 19 and 24. In other embodiments, other control flow instructions may be used, such as "switch" instructions, goto instructions, or the like. The control flow instructions can ensure that the correct conditions are imposed on a value of a name-value input.

The validation instructions can include instructions that implement conditions specified in the declaration for each name-value argument. In this example, the instructions at lines 46 to 53 determine whether a potential input value corresponding to the name-value argument "Name" satisfies the conditions imposed on the name-value argument "Name" in the declaration. The instruction at line 46 tests whether the potential input value is the data type "string". If not, the instruction at line 48 tests whether the potential input value can be converted to the data type "string". Similarly, the instructions at lines 59 to 75 determine whether a potential input value corresponding to the name-value argument "Height" satisfies the conditions imposed on the name-value argument "Height" in the declaration. The instruction at line 61 tests whether the potential input value has the data type "double". If not, the instruction at line 63 tests whether the potential input value can be converted to the data type "string". The instruction at line 70 tests whether the potential input value is positive.

A subset of the instructions can track the positions of the input values in the function invocation. As depicted in FIG. 5B, the validation instructions can include instructions encoding an association between the input order of an invocation of "fun3" and the argument order of "fun3" into one or more temporary variables. As a non-limiting example, the function signature of "fun3" can be modified to recite "varargin", a variable-length input list that enables the function to accept any number of inputs and stores these inputs in an array, at line 1. Two temporary variables can be created to map each name-value argument of the function to a value of a corresponding name-value input in "varargin". An "options" array can store names of the name-value arguments (e.g., line 3). A "vindex" array can store the position in "varargin" of each value corresponding to a name-value argument (e.g., line 4). The indices of the "options" array and the "vindex" array can establish a correspondence: the name stored at an index value in the "options" array can be the name of a name-value argument and the position stored at the same index value in the "vindex" array can be the position in "varargin" of the value of the name-value input corresponding to that name-value argument. A "for" loop (e.g., lines 8 to 28) can iterate over the variable-length input list, a pair of entries at a time (e.g., line 8). In each iteration, the instruction at line 9 can select the first entry in the pair of entries as a potential name of a name-value input (e.g., line 9). The potential name can be compared to the names in the "options" array (e.g., line 14). When a name in the "options" array matches the potential name (e.g., line 24), the position in "varargin" of the second entry in the pair of entries can be stored in "vindex" array at the same index as the matching name in the "options" array (e.g., line 27). In this manner, the temporary "vindex" array and "options" array can encode an association between the input order of an invocation of "fun3" and the argument order of "fun3".

As described herein, the association encoded in the temporary "vindex" array and "options" array can be used to identify the position of an incorrect value in an invocation of "fun3". For example, in FIG. 5C, the first entry in "vindex" contains the position in "varargin" of the input value for the name argument. This position can be assigned to the variable "vi" and included, at line 50, in an exception generated when the input value for the name argument is not, and cannot be converted to, a "string". In this manner, the exception can contain information about the position of the incorrect input value, regardless of the position of the incorrect input value in the input order.

A subset of the instructions can provide an indication regarding any nonsatisfaction of the condition and the input position. In some embodiments, the indication can be provided using an exception. As depicted in FIGS. 5B and 5C, for example, the instruction at line 11 generates an exception when a potential input name in "varargin" is not a valid data type for a name. By providing the index variable "j" to the function generating the exception, the position of the potential input name in "varargin" is incorporated into the exception. The instructions at lines 17 and 21 generate exceptions when the input name does not unambiguously match a single name-value argument in the "options" array. By providing the index variable "j" to the function generating the exception, the position of the potential input name in "varargin" is incorporated into the exception.

The instructions at lines 46 to 53 handle providing an indication when the potential input value corresponding to the "Name" argument is not, or is not convertible to, the "string" datatype. The instruction at line 48 generates an exception indicating a failed conversion to "string". The instruction at line 50 augments this exception with additional information. This additional information includes the position in "varargin" of the incorrect input value for the "Name" argument. The position information is incorporated into the exception by assigning the position to the temporary variable "vi" and then providing the variable "vi" to the function at line 50 augments the exception.

The instructions at lines 61 to 68 handle providing an indication when the potential input value corresponding to the "Height" argument is not, or is not convertible to, the "double" datatype. The instruction at line 63 generates an exception indicating a failed conversion to "double". The instruction at line 65 augments this exception with additional information. This additional information includes the position in "varargin" of the incorrect input value for the "Height" argument. This position information is incorporated into the exception by assigning the position to the temporary variable "vi" and then providing the variable "vi" to the function at line 65 that augments the exception. The instructions at lines 69 to 73 handle providing an indication when the potential input value corresponding to the "Height" argument is not positive. The instruction at line 70 generates an exception indicating that the potential input value corresponding to the "Height" argument is not positive.

The validation instructions also include instructions throwing the exceptions (e.g., lines 12, 33, 51, 66, and 72). An exception may then be handled in the code that invoked the function (e.g., by an exception-handling construct in the code such as a try/catch block, or the like) or displayed in the user environment.

FIGS. 6A to 6C depict an exemplary declaration and associated exemplary validation instructions suitable for use with inherited conditions on arguments, consistent with disclosed embodiments. FIG. 6A depicts the definition of a function "fun4" that inherits conditions from a class definition, consistent with disclosed embodiments. In this non-limiting example, the function "fun4" does not return a value and a comment represents the location of the body of the function. A declaration is indicated by the "arguments" keyword and the corresponding "end" keyword. The declaration includes a name-value structure "optional" that gets its field names and conditions on these field names from a class. In some embodiments, the public properties of the class may provide the field names and the conditions. If the class imposes conditions on the values that can be assigned to the public properties, the declaration imposes these conditions on the arguments to "fun4". In this non-limiting example, the declaration will impose the requirement that an invocation of "fun4" include name-value arguments corresponding to the public properties of "MyClass" with values satisfying any conditions imposed by the class on the values of these public properties. As described above, with regards to FIG. 5A, invocations of "fun4" are not limited to providing a structure as in input. In some embodiments, an invocation of "fun4" can take pairs of names and values as inputs, and the order of the names and values may differ from the order of the arguments in the declaration. Invocations of "fun4" that do not satisfy the declaration will generate an error message.

FIGS. 6B and 6C (a continuation of FIG. 6B) depict validation instructions generated to validate the declaration depicted in FIG. 6A. As described herein, the validation instructions can be generated by an execution engine. The validation instructions can be generated in response to an invocation of the function "fun4". The validation instructions can be generated during run-time or during compilation. As an example of run-time generation, the validation instructions can be generated in response to submission, at a command line of a user interface, of an invocation of "fun4" or of a script file including an invocation of "fun4". As an example of generation during compilation, the validation instructions can be generated in response to compilation of "fun4" into another, lower-level representation (e.g., an intermediate representation, assembly, machine code, or the like).

The validation instructions depicted in FIGS. 6B and 6C includes exemplary instructions for checking and tracking name-value inputs. A subset of these instructions validates the input values in an invocation of function "fun4". Similar to the validation instructions depicted in FIGS. 5B and 5C, the validation instructions depicted in FIGS. 6B and 6C, can include instructions that sequentially determine whether potential input names are valid (e.g., using the "for" loop beginning at line 6 and ending at line 32) and encode into control flow instructions one or more names of the name-value arguments (e.g., using the instructions at lines 3, 4, 12 and the control flow instructions at 13, 17, and 24).

The validation instructions can include instructions that implement conditions specified in the declaration for each name-value argument. In this example, the instructions at lines 46 to 53 determine whether a potential input value corresponding to one of the public properties of the class "MyClass" satisfies one or more conditions specified for that class. The instructions at lines 46 and 47 obtain the current property and the current input value associated with that property. The instruction at line 49 determines whether the current input value satisfies the one or more conditions specified for that class.

A subset of the instructions can track the positions of the input values in the function invocation. Similar to the validation instructions depicted in FIGS. 5B and 5C, the validation instructions depicted in FIGS. 6B and 6C, can include instructions encoding an association between the input order of an invocation of "fun4" and the argument order of "fun4" into one or more temporary variables. As a non-limiting example, the function signature of "fun4" can be modified to recite "varargin", a variable-length input list that enables the function to accept any number of inputs and stores these inputs in an array, at line 1. Two temporary variables can be created to map each name-value argument of the function to a value of a corresponding name-value input in "varargin". An "options" array can store names of the name-value arguments (e.g., line 3). These names can be properties of the class "MyClass". A "vindex" array can store the position in "varargin" of each value corresponding to a name-value argument (e.g., line 4). As described above with regards to FIGS. 6B and 6C, the "options" array and the "vindex" array can establish a correspondence between a name-value argument and a position in "varargin" of the value of the name-value input corresponding to that name-value argument. This correspondence can be used to identify the position of an incorrect value in an invocation of "fun4". A "for" loop can iterate over the entries of the options array (e.g., lines 43 to 55), obtain the position of the input value corresponding to a name-value argument from the "vindex" array (e.g., line 44) and, should the input value be incorrect (e.g. line 49), provide that position to a function that augments exceptions with position information (e.g., line 51).

A subset of the instructions can provide an indication regarding any nonsatisfaction of the condition and the input position. In some embodiments, the indication can be provided using an exception. Similar to the validation instructions depicted in FIGS. 5B and 5C, the validation instructions depicted in FIGS. 6B and 6C, can include provide an indication when input name is not of the correct data type, does not match exactly one of the name-value arguments, or when too many input values are provided. The validation instructions can handle catching an error generated when the relevant condition is not satisfied and augmenting this error with tracking information, such as the tracking information described above with regards to FIGS. 5B and 5C. The validation instructions also include instructions throwing the exceptions (e.g., lines 10, 16, 20, 31, and 52). An exception may then be handled in the code that invoked the function (e.g., by an exception-handling construct in the code such as a try/catch block, or the like) or displayed in the user environment Instructions elsewhere in the validation instructions handle providing an indication when the potential input values do not satisfy one or more conditions imposed by the definition of "MyClass" on the corresponding properties of "MyClass." For example, instructions at lines 48 to 53 test whether the current input value satisfies such a condition. Should the test generate an error, the instructions handle catching the error, augmenting the error with tracking information, and throwing the error for handling elsewhere in the program or display in the user environment. In this non-limiting example, the tracking information includes the position of the incorrect input value in the function invocation, the name-value argument corresponding to the incorrect input value, and the incorrect value.

Figure 7:
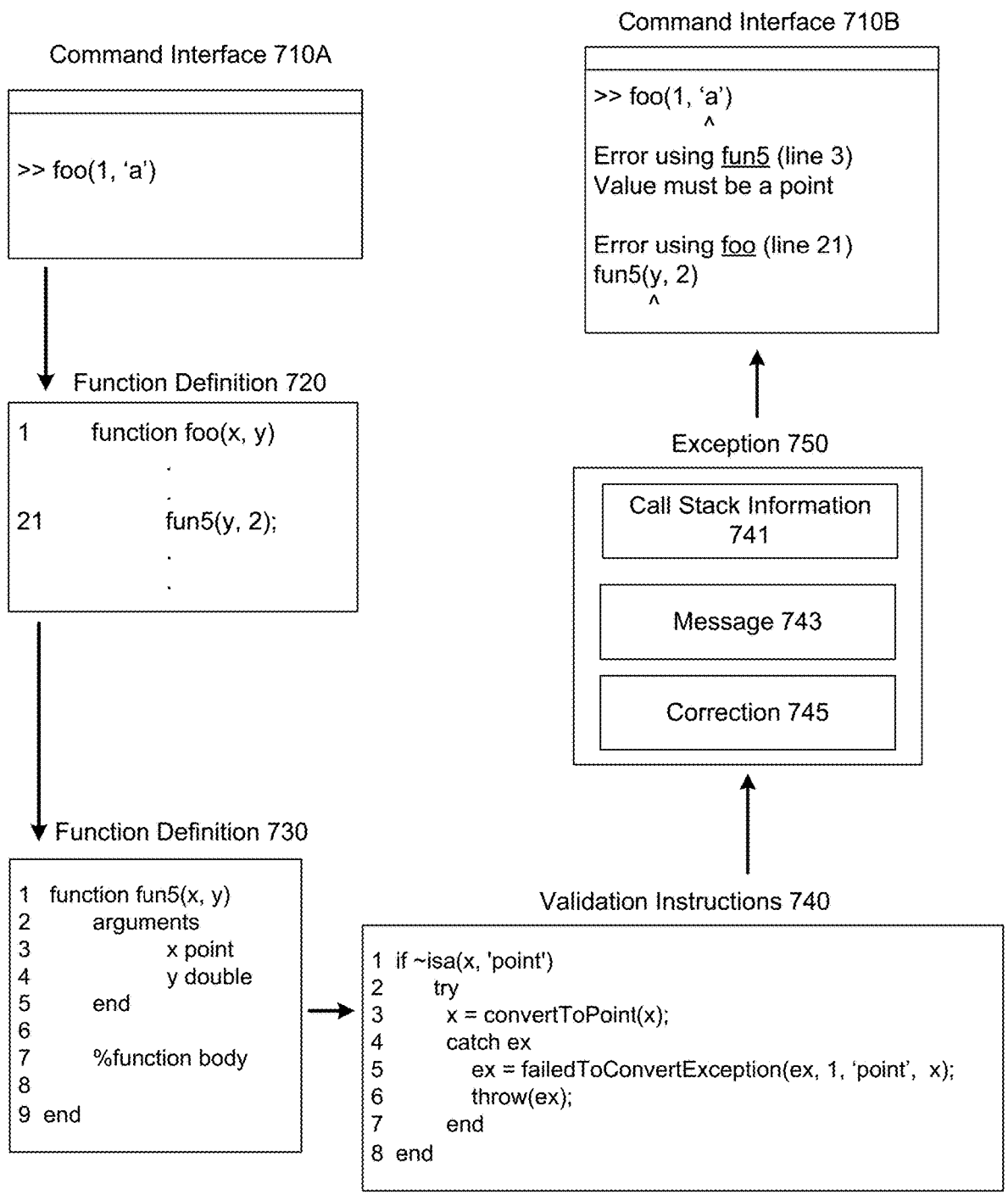
FIG. 7 depicts an exemplary argument-checking process that uses call stack information, consistent with disclosed embodiments.

FIG. 7 depicts an exemplary argument-checking process 700 that uses call stack information to identify an origination point of an incorrect invocation of a function, consistent with disclosed embodiments. In this non-limiting example, process 700 begins when a function "foo" is invoked at the command line interface, invoking in turn function "fun5" inside the function foo. The arguments of "fun5" are validated, generating an exception, which can include call stack information. In this non-limiting example, the exception is not handled by function "foo", but is instead displayed in the command line interface to the user. As shown, the display can include information about an origination point of the exception (e.g., the invocation of function "foo" with the character 'a' rather than an object of type "point"), in addition to the proximate cause of the exception. Displaying information concerning the origination point of the exception can benefit users unable or unwilling to review function "foo" to determine why the invocation of function "fun5" was incorrect. Thus displaying such information can improve the user experience with the programming environment and the programming efficiency of the programming environment. The operations of process 700 are detailed below.

In an operation of process 700, function "foo" is invoked at the command line with two input values: a double with the value 1 and a character with the value 'a'. In some embodiments, arguments, local variables, or return address information for the function "foo" can be pushed onto a call stack of the system invoking "foo". Execution can transfer to the code of function "foo" (e.g., function definition 720).

In an operation of process 700, function "fun5" is invoked during execution of function definition 720. Function "fun5" is invoked at line 21 of function definition 720 with two input values. The first input value is the value of the variable "y", an argument of function "foo". In this non-limiting example, the variable "y" retains the value 'a' provided in the invocation of "foo" and is of datatype "char". The second input value has datatype "double" and value 2. In some embodiments, arguments, local variables, or return address information for the function "fun5" can be pushed onto a call stack of the system invoking "fun5". Execution can transfer to the code of function "fun5" (e.g., function definition 730).

In a third operation of process 700, validation instructions 740 can be generated from a declaration in function definition 730. The declaration can specify conditions on the input values in an invocation of "fun5". In particular, the declaration can specify that the first input value has the datatype "point" and the second input value has the datatype "double." In this non-limiting example, validation instructions 740 may be generated when the "fun5" is invoked. Alternatively, as described herein, validation instructions 740 can be generated prior to invocation of "fun5". Validation instructions 740 may be inlined with "fun5" or may be executed in a separate context from "fun5". In some embodiments, this separate context can be similar to the context of a function invoked by "fun5". In various embodiments, the separate context may provide read-only access to the arguments of "fun5", may not provide write access to the arguments of "fun5", or may not provide any access to other variables within the scope of "fun5".

In a fourth operation of process 700, validation instructions 740 can be executed to validate and track input values provided in the invocation of "fun5". As depicted in FIG. 7, validation instructions 740 can include a subset of instructions that validate the conditions imposed on argument "x" by the declaration. For example, the instructions at lines 1 and 3 can determine whether "x" has datatype "point", or if not, whether "x" can be converted to datatype "point." In this non-limiting example, the declaration specifies a constant position for argument "x". The instructions can therefore encode, as the position of the input value corresponding to argument "x" in an invocation of "fun5", a constant value. In this non-limiting example, argument "x" is the first argument, and therefore the instruction at line 5 of validation instructions 740 encodes the constant "1" as the position of the input value corresponding to argument "x".

In some embodiments, validation instructions 740 can also be executed to provide validation and tracking results. As depicted in FIG. 7, validation instructions 740 includes a subset of instructions executable to provide an indication when the conditions imposed on argument "x" by the declaration are not satisfied. In some embodiments, the indication can indicate the nonsatisfaction of a condition imposed on argument "x" or the position of the input value corresponding to argument "x" in the invocation of "fun5". For example, the instructions at lines 2 to 6 can handle generating an exception when argument "x" is not of datatype "point", augmenting that exception with tracking information. The instruction at line 6 throws the exception. The exception may then be handled in the code that invoked the function (e.g., by an exception-handling construct in function "foo" such as a try/catch block, or the like) or displayed in the user environment. The tracking information can include the position of the input value in the function invocation (e.g., the constant "1" in this example) and the incorrect value (e.g., the character 'a' in this example).

In an operation of process 700, exception 750 can be handled. Exception 750 can be handled by validation instructions 740, function "fun5", function "foo", or the computing environment. In some embodiments, handling exception 750 can include terminating execution of function "fun5" or function "foo". In various embodiments, handling exception 750 can include returning control to the command line. In other embodiments, exception 750 can be caught and handled by error correction functionality. For simplicity of explanation, such error correction functionality is described herein as provided by validation instructions 740, but this functionality may also be provided by "fun5", "foo", or the computing environment.

In some embodiments, exception 750 can include call stack information 741. In some embodiments, the call stack information can include a file name, function name, or line number, or character position within a line where the exception was thrown. A line number or character position where the exception was thrown can depend on the implementation of validation instructions 740 (e.g., inline with function definition 730, in a separate context, or the like) and the implementation of the exception (e.g., whether the exception is treated as having been thrown by validation instructions 740 or by function definition 730). In some embodiments, as shown in FIG. 7, the line number or character position where the exception was thrown can be defined as the line number (e.g., line 3) or character position in the declaration for the argument that failed validation. Alternatively, the line number (e.g., line 2) or character position where the exception was thrown can be specified as the line number or character position of the "arguments" keyword defining the beginning of the arguments block specifying the argument that failed validation. When the error occurred in a called function, the call stack information can include a file name, function name, line number, or character position of execution for each of the called functions. In the non-limiting example shown in FIG. 7, the call stack information can also include the character position or line number in "foo" where "fun5" was called (e.g., line 21). In various embodiments (not shown in FIG. 7), call stack information 741 can be provided separately from exception 750.

In some embodiments, exception 750 can include message information 743. Message information 743 can include information about the cause of the exception. Message information 743 can include a string or a vector of characters. In some embodiments, handling exception 750 can include creating or editing message information 743. Instructions in validation instructions 740 can handle creation or editing of message information 743. For example, validation instructions 740 can include an instruction that generates an exception having message information 743 describing an error (e.g., an MException instruction, or the like) or include an instruction that modifies message information 743 (e.g., an addCause instruction, or the like).

In some embodiments, exception 750 can include correction 745. Correction 745 can include information describing a potential correction to a function invocation including arguments that failed validation. In some embodiments, correction 745 can include a string or a vector of characters. In various embodiments, correction 745 can be an object indicating that additional arguments should be included in the function invocation, that the function invocation should use or not use a particular syntax, that a different function should be invoked with the same arguments, that an order of the arguments should be changed, that a value of an argument should be replaced with another value, or the like.

In some embodiments, handling exception 750 can include determining a correction for the function invocation. Validation instructions 240 can include a subset of instructions handling determination of such a correction. For example, validation instructions 240 can include instructions that handle determining whether permuting the order of the arguments, changing a sign of one or more of the arguments, adding an argument (e.g., with a default or predetermined value), or replacing an argument (e.g., with a default or predetermined value) would result in a valid function invocation.

In some embodiments, when a correction would result in a valid function invocation, validation instructions 240 can be configured to handle exception 750 by implementing the correction. For example, validation instructions 740 can include instructions that permute the order of the arguments when permuting the order of the arguments results in a valid function invocation. To continue this example, if variable "a" has a "double" datatype and variable "b" has a "point" datatype, then the invocation fun5(a, b) would incorrectly cause argument "x" to have datatype "double" and argument "y" to have datatype "point". In in this example, validation instructions 740 could include instructions that determine that permuting the input values would result in a valid invocation of "fun5". Validation instructions 740 could include instructions handling the reassignment of the value of argument "x" to argument "y" and the reassignment of the value of argument "y" to argument "x". Normal execution of "fun5" could then proceed using the reassigned arguments. As an additional example, validation instructions 240 can include a subset of instructions that automatically attempt to correct an input value of an incorrect datatype. For example, as shown in FIG. 4B at line 13, when a datatype of an input is supposed to be "double", the validation instructions can attempt to convert the input to type "double". As an additional example, as shown in FIG. 5C at line 48, when a datatype of an input is supposed to be "string", the validation instruction can attempt to convert the input to type "string".

In an operation of process 700, an indication regarding the invalidity of the function invocation can be provided to the user. The indication can be generated by the computing environment. In various embodiments, the indication can be generated using exception 750. The indication can depict call stack information, provide an error message, suggest a correction, or warn of performance of an automatic correction.

In some embodiments, the indication can include messages indicating a file name, function name, line number, or character position where an exception was thrown. When the exception occurred in a called function, the messages can indicate a file name, function name, line number, or character position for each of the called functions. Such messages can be generated using call stack information 741. For example, command interface 710B, depicted in FIG. 7, depicts an exemplary response to the invocation of the function "foo" depicted in command interface 710A. This exemplary response includes messages indicating a function name (e.g., "error using foo") and line number (e.g., "line 21") for each of the called functions. In some embodiments, these messages can be generated using call stack information 741.

In some embodiments, the indication can include an error message indicating the cause of the error. Such error messages can be generated using message information 743. For example, the exemplary response depicted in command interface 710B includes the error message "value must be a point". In this non-limiting example, the content of this message may have been included in message information 743. In various embodiments, as described herein, the indication can identify the origination point of the input value responsible for the exception. In the non-limiting example depicted in FIG. 7, the programming environment (e.g., the TCE) can be configured to determine that the incorrect input in "fun5" originated as the second input in the invocation of "foo". The exemplary response depicted in command interface 710B can therefore indicate both input values as responsible for the exception (e.g., the 'a' input value in the invocation of "foo" and the "y" input value in the invocation of fun5).

In various embodiments, when handling exception 750 includes determining a correction to the function invocation, the indication can include a suggestion to correct the function invocation. The suggestion can be generated using correction 745. In some embodiments, when handling exception 750 includes automatically correcting invocation of a function, the indication can include warning message. The warning message can indicate that an automatic correction was performed. In some embodiments, the message can indicate how the automatic correction was performed (e.g., which input values were permuted, modified, or the like). A users may benefit from such messages, as they may alert the user to the incorrect invocation and permit the user to determine whether execution of the function with the corrected input values would produce, or likely produce, a valid output.

FIGS. 8A to 8C depict exemplary declarations, consistent with disclosed embodiments. FIG. 8A depicts an exemplary declaration included in a function definition. The function definition includes a function signature that lists arguments to the function and multiple arguments blocks specifying conditions on the function arguments. The function signature can list one or more positional arguments (e.g., "inputArg"), one or more name-value arguments (e.g., "Name- ValueArgs"), or one or more structures that inherit fields and validation conditions from the public properties of a class (e.g., "structName"). In some embodiments, the one or more positional arguments may include required or optional positional arguments followed by repeating positional arguments. In some embodiments, the one or more name-value arguments can be represented in the function definition by a structure having fields corresponding to the name-value arguments (e.g., "NameValueArgs.Name1"). The one or more name-value arguments and the one or more structures, in some embodiments, may follow the positional arguments in the function signature.

The function definition can include one or more arguments blocks. Each argument block can be delimited by keywords (e.g., "arguments" and "end" keywords, or the like). Each argument block can include one or more argument definitions. The argument definitions can include the name of the argument and at least one of a size of the argument, a datatype of the argument, a list including one or more validation functions for checking the argument, or a default value for the argument. The validation functions can take default arguments, constant arguments, or input values as arguments (e.g. a validation function could take one or more input values corresponding to arguments as inputs). The variable definition can include a default value for the argument in case such a value is not provided by in the function invocation.

An arguments block can include a keyword to indicate that the variables are repeated zero or more times in the function invocation, as disclosed above with regards to FIGS. 4A to 4C. Positional arguments can be defined before name-value arguments. In some embodiments, arguments blocks specifying repeated arguments may exclude argument definitions for name-value arguments or argument definitions for structures inheriting fields and conditions from classes.

An arguments block can specify conditions on name-value arguments, as disclosed above with regards to FIGS. 5A to 5C. In some embodiments, as shown in FIG. 8A, the name-value arguments can be specified as fields of a structure. For example, the instruction:

NameValueArgs.Name1    size    datatype validation_function=defaultValue can specify conditions on an input value corresponding to the name-value argument "Name1". The conditions can include conditions on the size or datatype of the input value. The conditions can include additional conditions imposed on the input value by one or more validation functions. When the conditions include a default value, validation instructions generated from the declaration can assign the default value to the name-value argument, when an invocation of the function does not include an input value corresponding to the name-value argument.

An arguments block can specify that a structure inherits fields and conditions from the properties of a class, as described above with regards to FIGS. 6A to 6C. In some embodiments, as shown in FIG. 8A, the inheritance can be specified by referencing the name of the class. For example, the instruction:

structName.?ClassName can specify that structName inherits properties of the class ClassName as name-value arguments. Input values in a function invocation that correspond to these name-value arguments can be subject to conditions imposed by ClassName on the properties of ClassName. Such conditions can specify permissible sizes, datatypes, validation functions, or default values, as described herein. Additional argument definitions can augment or change the conditions imposed on one of these name-value arguments, once this inheritance has been defined. For example, when ClassName includes the property PropertyName, the instruction:

structName.PropertyName    size    datatype validation_function=defaultValue can specify or overwrite conditions on an input value in a function invocation that corresponds to the name-value argument "PropertyName".

FIG. 8B depicts an exemplary declaration inlined into a function signature. In this non-limiting example, the function myFunction takes input values corresponding to arguments "x", "y", and "z". Argument definitions for each of these arguments are included in the function signature. As depicted in FIG. 8B, these argument definitions can impose conditions on the size and datatype of an input value corresponding to an argument. The depicted argument definitions can further specify a default value or a list of one or more validation functions for checking the input value.

The syntaxes depicted in FIGS. 8A and 8B are not intended to be limiting. For example, while argument definitions are given in FIG. 8B as:

x:: (size) datatype {validation_function}=defaultValue other suitable syntaxes may be used, such as:

x: class[size]

x: [size] class

[size] class x x: class <class_parameters> x: class{class_parameters}

FIG. 8C depicts an exemplary declaration for a function included in a structured text document. In some embodiments, such a declaration can be stored separately from the definition of the function. For example, a computing environment can be configured to maintain a repository of declarations corresponding to functions executable in the computing environment. When such a function is invoked, a structured text document containing the declaration can be accessed and used to generate validation instructions for checking the function invocation.

As shown, the declaration can include key-value pairs specifying the name of each argument (e.g. "Name": "NameValue") and the conditions imposed on input values corresponding to each argument (e.g., "size": "SizeValue", or the like). The structured text document can be implemented using a markup language or data interchange format (e.g., XML, j son, YAML or the like). The envisioned declarations are not limited to such formats. Declarations can be implemented using other formats, such as other textual or graphical formats.

FIGS. 9A to 9C depict exemplary error indications, consistent with disclosed embodiments. Each of these non-limiting examples concerns a function "createImage" that takes an array of length two as a first input and a string as a second input. In these examples, the function "createImage" has been incorrectly invoked with the string as the first input and the array as the second input. The resulting error indications indicate that the invocation was incorrect, why the invocation was incorrect, indicate the incorrect input value in the invocation, or provide a suggestion for a correct invocation. As described herein, the computing environment can be configured to use information provided by the validation instructions (or other instructions, or the computing environment itself) in providing the exemplary error indications. For example, the computing environment can be configured to use position information, message information, or correction information provided by the validation instructions (or other instructions, or the computing environment itself) in providing the exemplary error indications. The additional information provided by these error messages can help users identify problems with the code that they are writing, using, or maintaining, making programming easier and more efficient, particularly for less-experienced users.

As shown in FIG. 9A, an error indication can indicate the incorrect argument. The incorrect argument can be indicated by emphasizing the incorrect argument in the function invocation. In the non-limiting example of FIG. 9A, the input value "blank" is emphasized in the original function invocation by inverting the color of the text (e.g., from black to white) and of the background (e.g., from white to black). Other techniques for emphasizing the incorrect input value can include animations (e.g., blinking, or the like) or changes in font (e.g., underline, italics, font type, font size, font weight, or the like). Additionally or alternatively, the error indication can indicate that the invocation was incorrect (e.g., "Error using createImage") and why the invocation was correct (e.g., "Value must be Numeric").

As shown in FIG. 9B, an error indication can include a suggested correction. The suggested correction can include a message (e.g., "Did you mean:", or the like). The suggested correction can also include a corrected invocation of the function (e.g., an invocation of the function "createImage" with the input values provided in the proper order). In some embodiments, the corrected invocation can be provided at a new command line prompt, to enable a user to immediately enter the corrected invocation. As further shown in FIG. 9B, the incorrect input value can be indicated by displaying additional characters in the graphical user interface. In this non-limiting example, the additional characters can be carets placed beneath the characters of the incorrect value.

As shown in FIG. 9C, an error indication can expressly include position information. The position information can be included in a message (e.g., "Invalid input argument at position 1", or the like). The position information can include the argument number (e.g., "position 1", or the like) a starting character (e.g., "character 14" or the like), or character range (e.g., "characters 14 to 20" or the like).

Figure 10:
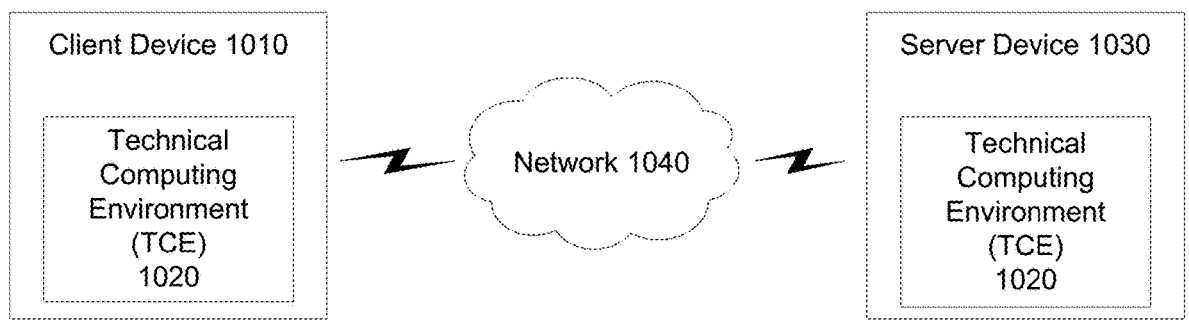
FIG. 10 depicts an exemplary technical computing environment suitable for use with the disclosed embodiments.

FIG. 10 depicts an exemplary computing environment 1000 in which systems and/or methods, described herein, may be implemented. As shown in FIG. 10, environment 1000 may include a client device 1010, which may include a programming environment (e.g., TCE 1020). Furthermore, environment 1000 may include a server device 1030, which may include the programming environment (e.g., TCE 1020), and a network 1040. Devices of environment 1000 may interconnect via wired connections, wireless connections, or a combination of wired and wireless connections.

Client device 1010 may include one or more devices capable of receiving, generating, storing, processing, and/or providing program code or information associated with program code (e.g., text, a token, an error, a pattern, etc.). For example, client device 1010 may include a computing device, such as a desktop computer, a laptop computer, a tablet computer, a mobile phone (e.g., a smart phone, a radiotelephone, etc.), or a similar device. Client device 1010 may receive input text, via TCE 1020, in a programming language associated with TCE 1020. Client device 1010 may process the input text to determine whether the input text is valid. When the input text is invalid, client device 1010 may determine valid program code based on the input text, as described in more detail elsewhere herein. Client device 1010 may prompt a user (e.g., via a user interface of TCE 1020) regarding the valid program code or may replace the input text with the valid program code. In some implementations, client device 1010 may receive information from and/or transmit information to server device 1030.

Client device 1010 may host TCE 1020. TCE 1020 may include any hardware-based component or a combination of hardware and software-based components that provides a computing environment that allows tasks to be performed (e.g., by users) related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 1020 may include a programming language that supports dynamic typing (e.g., the M language, a MATLAB® language, a MATLAB-compatible language, a MATLAB-like language, Julia, Python, etc.) that can be used to express problems and/or solutions in mathematical notations.

For example, TCE 1020 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 1020 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state-based analysis and/or design, etc.

TCE 1020 may further provide mathematical functions and/or graphical tools (e.g., for creating plots, surfaces, images, volumetric representations, etc.). In some implementations, TCE 1020 may provide these functions and/or tools using toolboxes (e.g., toolboxes for signal processing, image processing, data plotting, parallel processing, etc.). In some implementations, TCE 1020 may provide these functions as block sets or in another way, such as via a library, etc.

TCE 1020 may be implemented as a text-based programming environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based programming environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.), or another type of programming environment, such as a hybrid programming environment that includes one or more text-based programming environments and one or more graphically-based programming environments.

TCE 1020 may include a programming language (e.g., the MATLAB language) that may be used to express problems and/or solutions in mathematical notations. The programming language may allow a user to enter commands to be executed by TCE 1020. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following instructions:
A='hello'
A=int32([1, 2])
A=[1.1, 2.2, 3.3]

Now suppose the program is executed, for example, in a TCE, such as TCE 1020. During run-time, when the instruction "A='hello'" is executed, the data type of variable "A" may be a string data type. Later when the instruction "A=int32([1, 2])" is executed, the data type of variable "A" may be a 1-by-2 array containing elements whose data type are 32-bit integers. Later, when the instructions "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 1020 may provide mathematical routines and a high-level programming language suitable for non-professional programmers. TCE 1020 may provide graphical tools that may be used for creating plots, surfaces, images, volumetric representations, or other representations. TCE 1020 may provide these routines and/or tools using toolboxes (e.g., toolboxes for signal processing, image processing, data plotting, parallel processing, etc.). TCE 1020 may also provide these routines in other ways, such as, for example, via a library, a local data structure, a remote data structure (e.g., a database operating in a computing cloud), a remote procedure call (RPC), and/or an application programming interface (API). TCE 1020 may be configured to improve runtime performance when performing computing operations. For example, TCE 1020 may include a just-in-time (JIT) compiler Server device 1030 may include one or more devices capable of receiving, generating, storing, processing, and/or providing information associated with code. For example, server device 1030 may include a computing device, such as a server, a desktop computer, a laptop computer, a tablet computer, or a similar device. In some implementations, server device 1030 may host TCE 1020. In some implementations, client device 1010 may be used to access one or more TCEs 1020 running on one or more server devices 1030. For example, multiple server devices 1030 may be used to execute program code (e.g., serially or in parallel), and may provide respective results of executing the program code to client device 1010.

In some implementations, client device 1010 and server device 1030 may be owned by different entities. For example, an end user may own client device 1010, and a third party may own server device 1030. In some implementations, server device 1030 may include a device operating in a cloud computing environment. In this way, front-end applications (e.g., a user interface) may be separated from back-end applications (e.g., program code execution). Additionally, or alternatively, server device 1030 may perform one, more, or all operations described elsewhere herein as being performed by client device 1010.

Network 1040 may include one or more wired and/or wireless networks. For example, network 1040 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 10 are provided as an example. In practice, there may be additional devices and/or networks, fewer devices and/or networks, different devices and/or networks, or differently arranged devices and/or networks than those shown in FIG. 10. Furthermore, two or more devices shown in FIG. 10 may be implemented within a single device, or a single device shown in FIG. 10 may be implemented as multiple, distributed devices. Additionally, or alternatively, a set of devices (e.g., one or more devices) of environment 1000 may perform one or more functions described as being performed by another set of devices of environment 1000.

Figure 11:
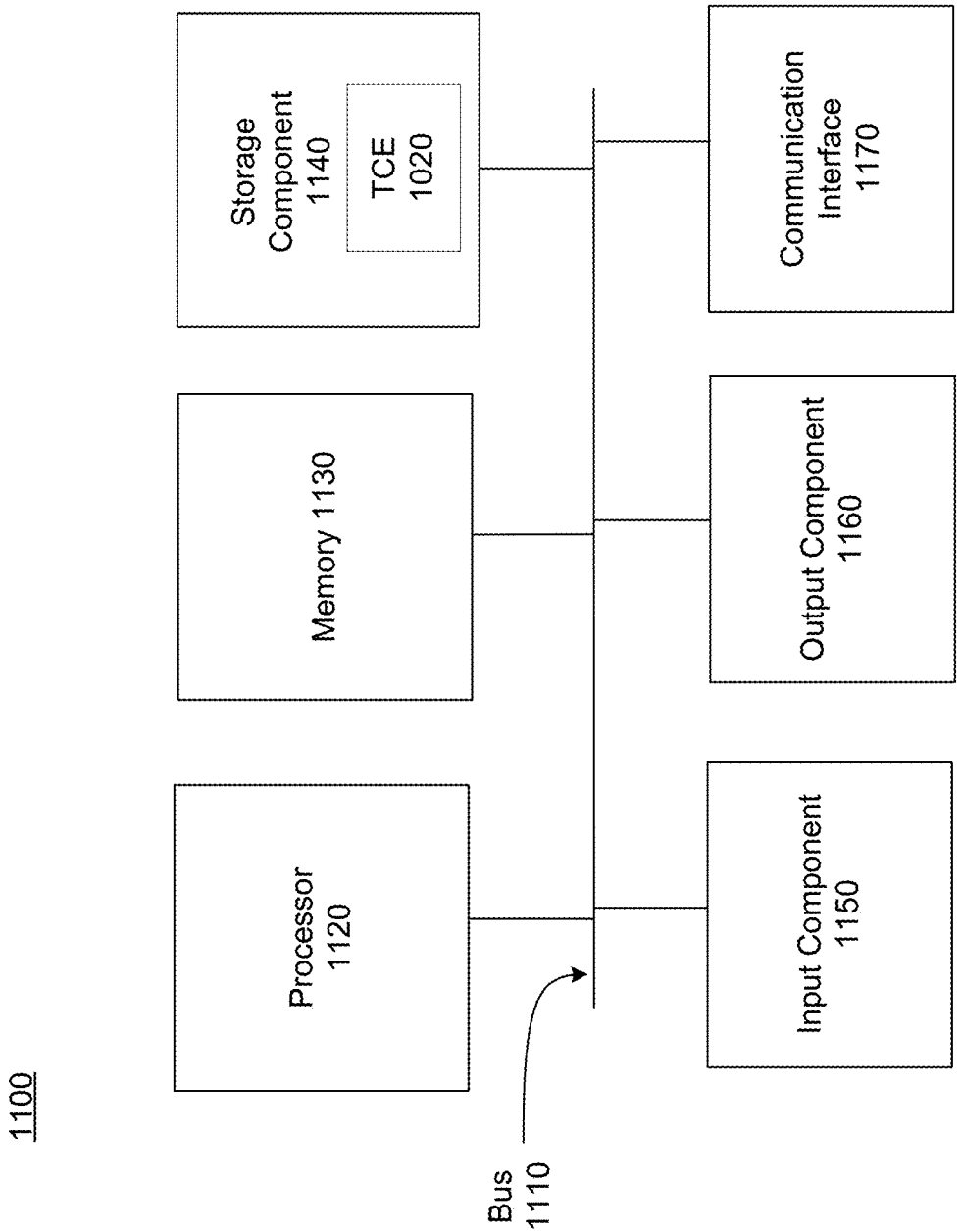
FIG. 11 depicts an exemplary computing system suitable for use with the disclosed embodiments.

FIG. 11 depicts an exemplary device 1100 suitable for use with the disclosed embodiments. Device 1100 may correspond to client device 1010, server device 1030, or a like device. In some implementations, client device 1010, server device 1030, or the like device may include at least one of device 1100 or at least one component of device 1100. As shown in FIG. 11, device 1100 may include a bus 1110, a processor 1120, a memory 1130, a storage component 1140, an input component 1150, an output component 1160, and a communication interface 1170.

Bus 1110 can include a component that permits communication among the components of device 1100. Processor 1120 can be implemented in hardware, firmware, or a combination of hardware and software. Processor 1120 can be a central processing unit (CPU), a graphics processing unit (GPU), an accelerated processing unit (APU), a microprocessor, a microcontroller, a field-programmable gate array (FPGA), an application-specific integrated circuit (ASIC), or another suitable processing component. In some implementations, processor 1120 can include one or more processors capable of being programmed to perform a function. Memory 1130 can include a random-access memory (RAM), a read-only memory (ROM), or another suitable dynamic or static storage device (e.g., a flash memory, a magnetic memory, and/or an optical memory) that stores information and/or instructions for use by processor 1120.

Storage component 1140 can store information and/or software related to the operation and use of device 1100. For example, storage component 1140 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 1150 can include a component that permits device 1100 to receive information, such as via user input (e.g., a touch screen display, a keyboard, a keypad, a mouse, a button, a switch, and/or a microphone). Additionally, or alternatively, input component 1150 can include a sensor for sensing information (e.g., a global positioning system (GPS) component, an accelerometer, a gyroscope, and/or an actuator). Output component 1160 can include a component that provides output information from device 1300 (e.g., a display, a speaker, and/or one or more light-emitting diodes (LEDs)).

Communication interface 1170 can include a transceiver-like component (e.g., a transceiver and/or a separate receiver and transmitter) that enables device 1100 to communicate with other devices, such as via a wired connection, a wireless connection, or a combination of wired and wireless connections. Communication interface 1170 can permit device 1100 to receive information from another device and/or provide information to another device. For example, communication interface 1170 can include an Ethernet interface, an optical interface, a coaxial interface, an infrared interface, a radio frequency (RF) interface, a universal serial bus (USB) interface, a Wi-Fi interface, a cellular network interface, or the like.

Device 1100 can be configured to perform one or more processes described herein. Device 1100 may perform these processes (e.g., a computer-implemented method) in response to processor 1120 executing software instructions stored by a non-transitory computer-readable medium, such as memory 1130 or storage component 1140. A computer-readable medium can be a non-transitory memory device. A memory device can include memory space within a single physical storage device or memory space spread across multiple physical storage devices.

Software instructions can be read into memory 1130 or storage component 1140 from another computer-readable medium or from another device via communication interface 1170. When executed, software instructions stored in memory 1130 or storage component 1140 can cause processor 1120 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 11 are provided as an example. In practice, device 1300 can include additional components, fewer components, different components, or differently arranged components than those shown in FIG. 11. Additionally, or alternatively, a set of components (e.g., one or more components) of device 1100 may perform one or more functions described as being performed by another set of components of device 1100.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. At least one non-transitory, computer-readable medium containing first instructions that, when executed by at least one processor of a system, cause the system to perform operations comprising:
   obtaining a declaration for a function, wherein the declaration specifies a condition on an argument to the function, and wherein the function is invocable based on one or more inputs provided in an input order;
   generating, based on the declaration, second instructions that include:
      a first subset of the second instructions, based on the condition, that when executed cause the system to determine whether a value of an input corresponding to the argument satisfies the condition; and
      a second subset of the second instructions that when executed cause the system to identify a position of the input within the input order; and
   executing the function, in response to an invocation of the function, the invocation including a first input corresponding to the argument at a first input position in the input order, the first input having a first value, executing the function comprising:
      executing the first subset of the second instructions to determine whether the first value satisfies the condition;
      executing the second subset of the second instructions to identify the first input position as the position of the input within the input order; and in response to determining that the first value does not satisfy the condition, providing an indication regarding the nonsatisfaction of the condition and the first input position.

2. The at least one non-transitory, computer-readable medium of claim 1, wherein:
the declaration indicates that the position of the input within the input order is constant; and
the second instructions encode a constant value for the position of the input within the input order.

3. The at least one non-transitory, computer-readable medium of claim 1, wherein:
the declaration indicates that the position of the input within the input order is variable; and
the second instructions encode the position of the input within the input order into a temporary variable or index variable.

4. The at least one non-transitory, computer-readable medium of claim 1, wherein:
the declaration indicates that the argument is a name-value argument; and
the second instructions include control flow instructions encoding a name of the name-value argument.

5. The at least one non-transitory, computer-readable medium of claim 4, wherein:
the declaration indicates a class; and
the name-value argument and the condition are specified in a class definition of the class, the class definition separate from the declaration.

6. The at least one non-transitory, computer-readable medium of claim 1, wherein:
the second instructions include instructions to sequentially determine, for each of the one or more inputs, when executed, whether the value of the input satisfies the condition and identify the position of the input within the input order.

7. The at least one non-transitory, computer-readable medium of claim 6, wherein:
the function includes two or more arguments arranged in an argument order; and
a sequence of the sequential determination differs from the argument order.

8. The at least one non-transitory, computer-readable medium of claim 1, wherein:
the second instructions further include:
a third subset of the second instructions that at least one of:
provides, when executed in response to a determination that the value of the input does not satisfy the condition, the indication regarding the nonsatisfaction of the condition and the position of the input; or
encodes, when executed in response to the determination that the value of the input does not satisfy the condition, the position of the input as an argument to an exception function, wherein:
the exception function is configured to generate an exception object including an indication of the position of the input, and
providing the position of the input comprises providing the exception object.

9. The at least one non-transitory, computer-readable medium of claim 1, wherein the indication is graphical or textual.

10. The at least one non-transitory, computer-readable medium of claim 1, wherein:
the second instructions are generated and inserted into the function prior to the invocation of the function.

11. The at least one non-transitory, computer-readable medium of claim 1, wherein:
the second instructions are executed in response to the invocation of the function by a second function; and
executing the second instructions further comprises obtaining stack trace information for the function and the second function; and
the indication includes the stack trace information.

12. The at least one non-transitory, computer-readable medium of claim 1, wherein:
executing the function includes inlining the second instructions into a site of the invocation of the function.

13. The at least one non-transitory, computer-readable medium of claim 1, wherein:
the condition comprises at least one of an absolute or relative run-time type, size, or value condition.

14. The at least one non-transitory, computer-readable medium of claim 1, wherein:
the function includes one or more arguments arranged in an argument order;
the argument order differs from the input order, a difference between the argument order and the input order based on at least one of:
a difference between a number of the one or more arguments and a number of the one or more inputs;
an absence, from the one or more inputs, of inputs corresponding to an optional first subset of the one or more arguments;
a correspondence between a subset of the one or more arguments and multiple sets of inputs in the one or more inputs; or
a difference between a position of a name-value argument in the argument order differing from a position of a corresponding name-value input in the input order.

15. The at least one non-transitory, computer-readable medium of claim 1, wherein:
the second instructions further include:
another subset of the second instructions that:
determine, when executed in response to a determination that the value of the input does not satisfy the condition, a correction to the invocation of the function; and
provide a suggestion indicating the correction to a user; or
automatically correct the invocation of the function based on the correction.

16. The at least one non-transitory, computer-readable medium of claim 1, wherein:
obtaining the declaration comprises receiving a definition of the function that includes the declaration;
the declaration includes or refers to an XML, JSON, or YAML file that specifies the condition on the argument; or
obtaining the declaration comprises processing comments, documentation, or code to determine the condition on the argument of the function.

17. A computer-implemented method, comprising:
obtaining a declaration for a function, wherein the declaration specifies a condition on an argument to the function, and wherein the function is invocable based on one or more input values provided in an input order;
generating, based on the declaration, instructions that include:

a first subset of the instructions, based on the condition, that when executed by a system cause the system to determine whether a value of an input corresponding to the argument satisfies the condition; and a second subset of the instructions that when executed cause the system to identify a position of the input within the input order; and executing the function, in response to an invocation of the function, the invocation including a first input corresponding to the argument at a first input position in the input order, the first input having a first value, executing the function comprising:

executing the first subset of the instructions to determine that the first value does not satisfy the condition;

executing the second subset of the instructions to identify the first input position as the position of the input within the input order; and in response to determining that the first value does not satisfy the condition, providing an indication regarding the nonsatisfaction of the condition and the first input position.

18. The method of claim 17, wherein the instructions are generated and executed by different processors.

19. The method of claim 17, wherein:
the declaration indicates that the position of the input within the input order is constant; and
the instructions encode a constant value for the position of the input within the input order.

20. The method of claim 17, wherein:
the declaration indicates that the position of the input within the input order is variable; and
the instructions encode the position of the input within the input order into a temporary variable or index variable.

21. The method of claim 17, wherein:
the declaration indicates that the argument is a name-value argument; and
the instructions include control flow instructions encoding a name of the name-value argument.

22. The method of claim 17, wherein:
the instructions further include a third subset of the instructions that, when executed in response to a determination that the value of the input does not satisfy the condition,
cause the system to provide an error object indicating the nonsatisfaction of the condition and the position of the input; and
executing the function further comprises executing the third subset of the instructions to provide the error object.

23. The method of claim 17, wherein:
the instructions are generated and inserted into the function prior to the invocation of the function.

24. The method of claim 17, wherein:
the instructions are executed in response to the invocation of the function by a second function; and
executing the instructions further comprises obtaining stack trace information for the function and the second function; and
the indication includes the stack trace information.

25. The method of claim 17, wherein:
executing the function includes inlining the instructions into a site of the invocation of the function.

26. The method of claim 17, wherein:
the instructions further include:
another subset of the instructions that:
determine, when executed in response to a determination that the value of the input does not satisfy the condition, a correction to the invocation of the function; and
provide a suggestion indicating the correction to a user; or automatically correct the invocation of the function based on the correction.

27. A system comprising:
at least one processor; and
at least one non-transitory-computer, readable-medium containing first instructions that, when executed by the at least one processor of the system, cause the system to perform operations comprising:

obtaining a declaration for a function, wherein the declaration specifies a condition on an argument to the function, and wherein the function is invocable based on one or more input values provided in an input order;

executing second instructions including an invocation of the function, the invocation including a first input corresponding to the argument at a first input position in the input order, the first input having a first value, executing the second instructions comprising:

executing third instructions, the third instructions generated based on the declaration, to determine that the first value does not satisfy the condition on the argument, to identify the first input position within the input order, and, in response to the determination that the first value does not satisfy the condition, to provide an indication regarding the nonsatisfaction of the condition and the first input position:

wherein a first subset of the third instructions, when executed, causes the system to determine whether the first value satisfies the condition on the argument, the first subset generated based on the condition; and wherein a second subset of the third instructions, when executed, causes the system to identify the first input position of the first input within the input order.

* * * * *